United States Patent [19]

Nagae et al.

[11] Patent Number: 5,404,175
[45] Date of Patent: Apr. 4, 1995

[54] METHOD FOR PROJECTING IMAGE OBTAINED BY USING LIQUID CRYSTAL PANELS SEMICONDUCTOR SUBSTRATE AND DISPLAY APPARATUS FOR REALIZING THE SAME

[75] Inventors: Yoshiharu Nagae; Yuji Mori; Yoshiro Mikami; Hideo Sato; Minoru Hoshino, all of Hitachi; Kyohei Fukuda, Fujisawa, all of Japan

[73] Assignee: Hitachi, Ltd., Tokyo, Japan

[21] Appl. No.: 853,426

[22] Filed: Mar. 18, 1992

[30] Foreign Application Priority Data

Mar. 19, 1991 [JP] Japan ................................. 3-078227
Apr. 19, 1991 [JP] Japan ................................. 3-088123

[51] Int. Cl.6 ............................................. H04N 9/31
[52] U.S. Cl. ..................................... 348/751; 359/51; 348/744
[58] Field of Search ................... 358/231, 60, 61, 236, 358/232, 237; H04N 5/74, 9/31; 359/40, 41, 72, 85, 51, 59, 100, 102; 348/744, 750, 751, 758, 776, 778, 790

[56] References Cited

U.S. PATENT DOCUMENTS

| | | | |
|---|---|---|---|
| 4,796,978 | 1/1989 | Tanaka et al. | 350/337 |
| 4,842,374 | 6/1989 | Ledebuhr | 350/337 |
| 4,943,154 | 7/1990 | Miyatake | 358/60 |
| 4,983,032 | 1/1991 | Van Der Brandt | 358/60 |
| 5,095,377 | 3/1992 | Kobayashi | 359/85 |
| 5,150,232 | 9/1992 | Gunkima | 359/51 |
| 5,170,250 | 12/1992 | Ledebuhr | 358/60 |
| 5,260,815 | 11/1993 | Takizawa | 348/751 |

FOREIGN PATENT DOCUMENTS

| | | |
|---|---|---|
| 1-195782 | 8/1989 | Japan . |
| 212291 | 1/1990 | Japan . |
| 3-02429 | 2/1991 | Japan . |
| 294898 | 12/1988 | United Kingdom . |
| 402137 | 12/1990 | United Kingdom . |

OTHER PUBLICATIONS

M. Kunigita et al, A Full color Projection TV/using LC/Polymer Composite Light Valves (1990) pp. 227–230.
Shinji et al, LCD Full Color Video Projector (1986) pp. 375–378.

Primary Examiner—James J. Groody
Assistant Examiner—Chris Grant
Attorney, Agent, or Firm—Antonelli, Terry, Stout & Kraus

[57] ABSTRACT

In a projection-type display apparatus using light scattering type liquid crystal devices, light from a light source is reflected by a reflecting mirror through a collecting lens; reflected light is converted by a lens into a parallel light beam, which is injected into liquid crystal devices disposed on three sides through a dichroic mirror, the liquid crystal devices coloring an image in red, green and blue; the image is projected on a screen through again the dichroic mirror, the collecting lens and an enlarging lens. Further a photodetector is disposed at a focal point of the collecting lens and a function of adjusting the position of the light source on the basis of a result of this detection is added.

22 Claims, 21 Drawing Sheets

OFF STATE

ON STATE

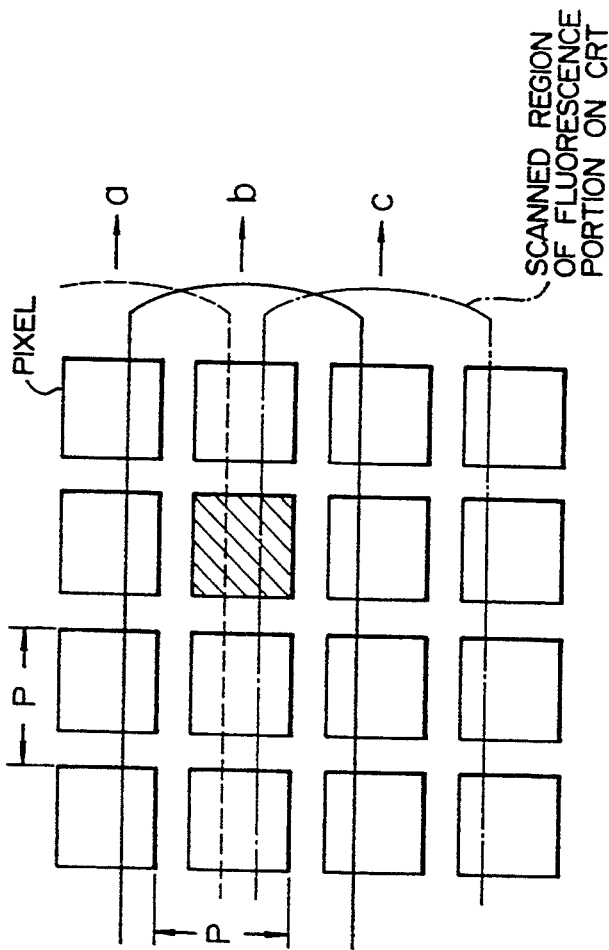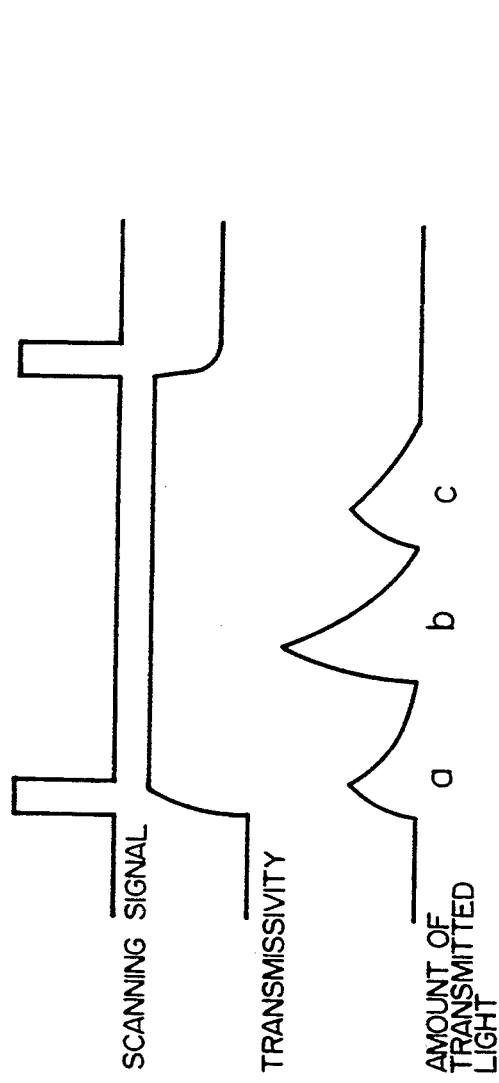
FIG. 19A
FIG. 19B
FIG. 19C
FIG. 19D

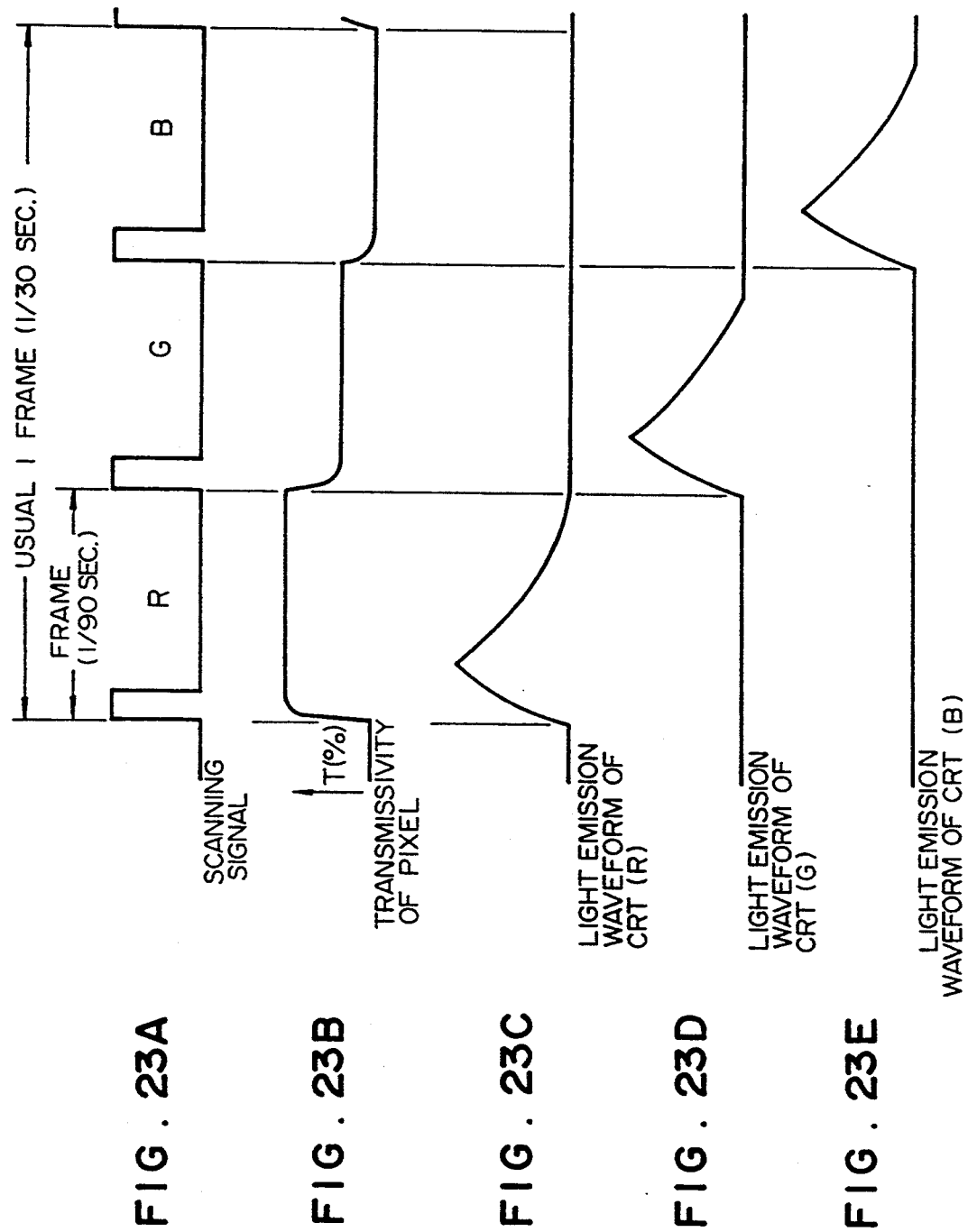

METHOD FOR PROJECTING IMAGE OBTAINED BY USING LIQUID CRYSTAL PANELS SEMICONDUCTOR SUBSTRATE AND DISPLAY APPARATUS FOR REALIZING THE SAME

BACKGROUND OF THE INVENTION

1. Field of the Invention

The present invention relates to an image reproducing apparatus, and in particular to a projection-type display apparatus for projecting an image to enlarge and display the same.

2. Description of Related Art

Heretofore a projection-type display apparatus for projecting an image of a small size and enlarging it optically, has been utilized for realizing a large image having more than 40 inches along a diagonal line. Small size liquid crystal panels are used often as light valves for forming a small size original image to be enlarged optically. That is, incident light from a light source is intensity-modulated by the liquid crystal panels. Intensity-modulated light thus obtained is projected on a screen, enlarging it optically by a projection lens, in order to realize a large image display.

Prior art techniques on such a projection-type display apparatus using liquid crystal panels are discussed in International Symposium Digest of SID, pp. 227–230 (1990). Hereinbelow this prior art techniques will be explained, referring to FIG. 25.

In FIG. 25, this apparatus includes 3 small size transmitting-type liquid crystal panels 1100, 1101 and 1102 with respective condenser lenses 1112, 1113 and 1114 driven in accordance with image signals corresponding to color images of red, blue and green, respectively, a light source 1103 of a metal halide lamp, a reflecting mirror 1104, 4 dichroic filters 1105, 1106, 1108 and 1109, mirrors 1107 and 1110, and a projection lens 1111. The optical system except for a screen 1120 is covered by a cover 1115.

On the other hand, as another prior art technique, there is known a liquid crystal display apparatus disclosed in JP-A-1-195782. In this prior art technique a cathode ray tube was used as a light source instead of a discharge tube such as a metal halide lamp. In this prior art, no attention was paid to the life of the light source and the necessity of maintaining a sufficient amount of light and therefore it had a problem from a view point of downsizing and maintenance of the apparatus, as explained below.

At first, in this prior art, a light source such as a metal halide lamp, etc. is used. Therefore, although it is possible to generate light with a high brightness, since it emits white light, it is necessary to separate the white light into different color components by dichroic filters and to combine color components in order to display it. For this reason there were problems that the optical system is enlarged and complicated so that adjustment of the optical system is difficult and that mechanism and parts for adjusting the optical axis are required and thereby weight is increased. Also, the life of the metal halide lamp is as short as about 2000 hours. Consequently, supposing that it is used, e.g., 6 hours a day, the life of the lamp expires in about one year. For this reason it is inevitable to exchange it during the usable period of the optical system and an exchange frequency is as high as about once a year. Further, the metal halide lamp is expensive and in addition special techniques are required for handling and exchange thereof. Therefore, there was a problem that it is difficult for a user to handle or exchange it freely.

Further, the prior art apparatus had a problem that increase in the size and complication of the optical system including a position adjusting mechanism and the apparatus are inevitable, because it is necessary to always use different liquid crystal panels for the 3 primary colors, in order to obtain a bright color image.

In addition, in the liquid crystal display apparatus using a Braun tube, the problem to be solved is to compensate for slow response of the conventional liquid crystal display apparatus. Also, the Braun tube used there was that used in a usual television receiver and therefore there was a problem that it is difficult to obtain a brighter image, because sufficient light amount cannot be obtained when the Braun tube is used as a light source.

Further, in this prior art only one liquid crystal display panel is used. In the projection-type display apparatus, since a small-size liquid crystal display panel is used for the light modulation to reproduce a color image, the area of one pixel is extremely small. Therefore, decrease in the aperture ratio is caused, which reduces the efficiency of light utilization. Thus there was a problem that it is difficult to obtain a brighter image.

There is described a liquid crystal projection-type display apparatus using three TN-(Twisted Nematic-)type liquid crystal panels as an image source to obtain a color image by projecting it on a screen in detail in International Symposium Digest of SID, pp. 375–378 (1986).

Furthermore, recently, there is described a display apparatus using polymer-dispersed-type liquid crystal, in which liquid crystal is distributed in a transparent resin and by which a state of the liquid crystal is altered between a scattering state and a transparent state in response to a voltage applied from the exterior, instead of the TN-type liquid crystal, in the literature, International Symposium Digest of SID, pp. 227–230 (1990) described previously. Still further, in this article, thin film transistors are fabricated by using a polycrystalline silicon thin film.

Further JP-A-2-12291 can also be cited as a literature, in which the projection-type display apparatus is described. In this literature, the light source is located, deviated from the central axis and the projection lens is disposed at a position symmetric to the light source with respect to the central axis.

Among the above prior art techniques, in which the TN-type liquid crystal is driven by thin film transistors, there is a problem that since the thin film transistors themselves and the parts of wiring and electrodes for rows and columns cannot transmit light, the area of one pixel electrode effective for the display is decreased and the effective area is inevitably reduced usually to about 10% to 30% of the total area. Further, because of the light absorption by a polarizing plate inevitable for the TN-type liquid crystal, the light intensity is reduced below ½ by the polarizing plate. Therefore, there was a problem that since the transmittance of the liquid crystal panel is extremely small, a light source consuming high electric power is inevitably used in order to increase the brightness on the screen.

Further, even by those using polymer-dispersed-type liquid crystal, although it is possible to eliminate light loss by the polarizing plate, the area occupied by the thin film transistors and the parts of wiring and electrodes is still great, the transmittance of the liquid crystal panel is still insufficient.

Furthermore, in a conventional projection-type display apparatus, since the light source and the projection lens are located symmetrically with respect to the central axis, not only it is not possible to reduce the size satisfactorily, but also an amateur cannot exchange the lamp when the lamp serving as the light source is damaged. In the last case he or she should send the display apparatus to the maker so as to exchange the damaged lamp. This is because the resolution is extremely lowered, if a deviation of the optical axis, which is as small as several micrometers, is caused on the exchange of the light source.

SUMMARY OF THE INVENTION

The present invention has been done in view of the situation described above and the object thereof is to provide a method for enlarging and projecting an image, by use of liquid crystal panels and a projection-type display apparatus having a small size and a high precision for realizing the method.

In order to achieve the above object, a projection-type display apparatus according to the present invention includes a control section, an optical signal generating section including a plurality of liquid crystal panels, a combining optical system and a projecting section. The control section inputs an electric image signal representing an image and generates a plurality of electric signals. The plurality of electric signals thus generated are supplied to the plurality of liquid crystal panels in the optical-signal generating section. A plurality of optical signals are generated by using the plurality of liquid crystal panels and supplied to the combining optical system. The combining optical system generates an optical image signal by combining the plurality of optical signals. The optical image signal is projected on a screen by the projecting section.

According to the present invention, the efficiency of light utilization of the liquid crystal panel can be almost doubled by using a light-scattering-type liquid crystal panel requiring no polarizing plate and further the effective display area can be increased by using a reflection-type liquid crystal panel. In this way it is possible to realize a bright projection-type display apparatus with a low electric power consumption. Further, the size of the optical system can be reduced by using a reflective-type projection optical system. Furthermore, since peripheral driving circuits and various kinds of control circuits can be integrated in the liquid crystal panel, in which active elements such as transistors are formed on a silicon monocrystal wafer. Therefore, increase in the reliability owing to decrease in the number of connecting terminals, simplification in the mounting, and down sizing are possible. Still further, the apparatus is so constructed that light intensity and light amount can be measured more easily by detecting a light focusing point within the display apparatus and that the optical axis deviated on exchange of the lamp, vibration, etc. can be readjusted easily. Therefore, even an amateur can carry out lamp exchange, etc., resulting in improvement of usability of the apparatus.

In addition, according to the present invention, a plurality of monochromatic cathode ray tubes having different greatest intensity wavelength regions such as red (R), green (G) and blue (B), which are three primary colors of light, are used as the light source and hence the life of the apparatus is longer than 10000 hours. Thus, it is possible to provide a projection-type color display apparatus having no problem in maintenance of the light source and a sufficiently high utility. Further, even at the end of the life a CRT is never misfired, as a lamp is. Thus, according to the present invention, it is possible to provide easily a projection-type color display apparatus, whose duration of usability is remarkably longer. Furthermore the CRT can emit light of different colors of RGB separately at a high efficiency by selecting suitably fluorescent material. Consequently, according to the present invention, it is possible to obtain easily a display apparatus having excellent color reproduction characteristics.

In general, in a case of using a CRT for image display so as to increase brightness on the screen, it is necessary to increase current intensity of the electron beam. However, when the current intensity is increased, the diameter of the electron beam is increased, which causes lowering in the resolution of a projected image. That is, in a usual CRT, the brightness on the screen and the resolution are in a trade-off relation. Thus, in the case where the CRT is used as a light source for a projection-type display apparatus, the resolution is determined by the liquid crystal panel and therefore, even if the diameter of the electron beam is increased. This doesn't cause lowering in the resolution. Consequently according to the present invention, it is possible to increase satisfactorily the current intensity of the electron beam and in this way to realize easily a projection-type display apparatus having a high brightness and a high resolution.

BRIEF DESCRIPTION OF THE DRAWINGS

FIGS. 19A to 19D are diagrams for explaining the operation of the second embodiment of the present invention;

FIGS. 23A to 23E are timing charts for explaining FIGS. 22A to 22D, respectively;

DESCRIPTION OF THE PREFERRED EMBODIMENTS

Hereinbelow the projection-type display apparatus according to the present invention will be explained in detail, referring to the attached drawings.

Figure 1:
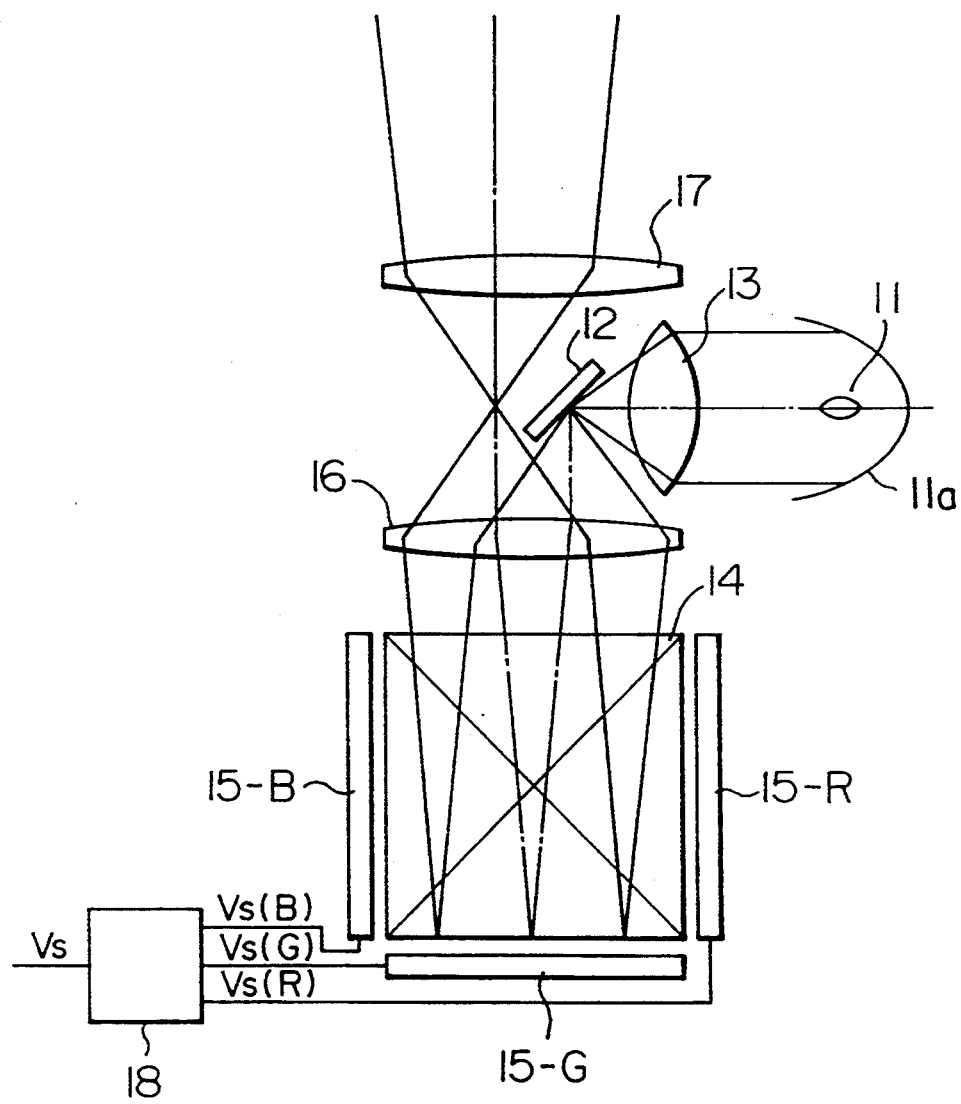
FIG. 1 is a diagram showing an optical system of a liquid crystal projection-type display apparatus relating to a first embodiment of the present invention.

FIG. 1 represents an optical system of the display apparatus according to the present invention, which includes a lens 13 for focusing white light emitted from a light source 11 on a reflecting mirror 12, a lens 16 for transforming the white light reflected by the reflecting mirror 12 into parallel light and irradiating the parallel light to a reflecting-type of liquid crystal panels 15-R, 15-G and 15-B corresponding to the three primary colors through a separating/combining optical system 14, and a lens 17 for projecting on a screen light which has been reflected by the liquid crystal panels 15-R, 15-G and 15-B and passed again through the optical system 14 and the lens 16. The three liquid crystal panels are driven by a driving circuit 18, in response to image signal $V_S(R)$, $V_S(G)$ and $V_S(B)$, respectively obtained by separating a color image signal $V_S$ into the three primary color component signals.

A metal halide lamp with a reflecting mirror 11a is used as the light source 11 and a dichroic reflecting mirror 11a is used for reflecting only visible light so that infrared light unnecessary for the display is not directed to the liquid crystal panels. The lens 13 plays the role of focusing light on the reflecting mirror 12 and is located so that the distance from the principal point of the lens to the light focusing portion of the reflecting mirror 12 approximately corresponds to the focal length. Since the light focusing portion of the reflecting mirror 12 is located at a point deviated from the optical center line of the lenses 16 and 17, the light focusing portion of light after having been reflected by the liquid crystal panels 15-R, 15-G and 15-G is located at a point deviated from the reflecting mirror 12. Therefore, there is no loss of the reflected light by the reflecting mirror 12. The reflecting mirror 12 is provided at 45 degrees with respect to the center line or optical axis of the lens 16. Incident light to the mirror 12 has an incident angle of more than 45 degrees and the incident angle is preferably within a region from 45 to 55 degrees. The lens 16 is located at a point distant from the light focusing point on the reflecting mirror 12 approximately by its focal length so that incident light to the lens 16 is transformed into parallel light, which is irradiated in the succeeding optical system 14. The optical system 14 is composed of a dichroic prism, which reflects the red component of the incident white light rightward in the figure and the blue component leftward, and transmits the green component downward.

Figure 2:
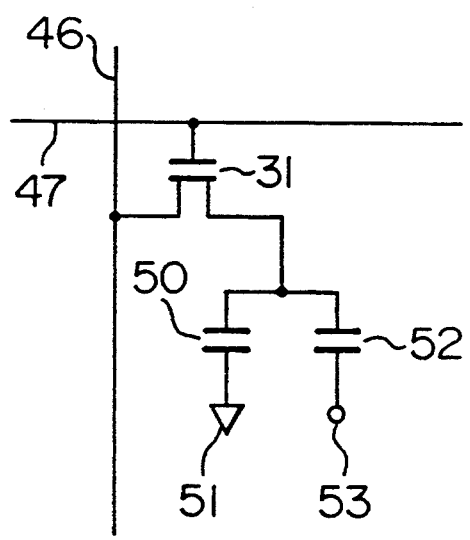
FIG. 2 is an equivalent circuit diagram representing one element, i.e., a pixel in a liquid crystal panel used in the display apparatus according to the present invention.

The liquid crystal panels 15-R, 15-G and 15-B are of reflection-type using light-scattering type liquid crystal and they are driven in response to the different primary color component signals obtained by separating the image signal. If a transparent portion on each panel is bright on the screen, the light scattering portion is displayed to be dark on the screen. In the equivalent circuit of each of pixels in each of the liquid crystal panels 15-R, 15-G and 15-B, as shown in FIG. 2, the gate of a transistor is connected to a row electrode 47, the drain to a column electrode 46 and the source to a pixel electrode. Further, in FIG. 2, there is disposed a storage capacitor 52 in parallel with a capacitor of a pixel 50 of liquid crystal which is connected to a transparent pixel electrode 51 common to all the pixels. The other end of the storage capacitor 52 is connected to an electrode 53 exclusively used therefor to hold the storage capacitors for all the pixels at a same potential. This storage capacitor 52 is disposed for the purpose of preventing that the driving current of the liquid crystal is lowered in accordance with its proper leak current and therefore it is unnecessary, if the liquid crystal has a sufficiently high impedance.

Figure 3:
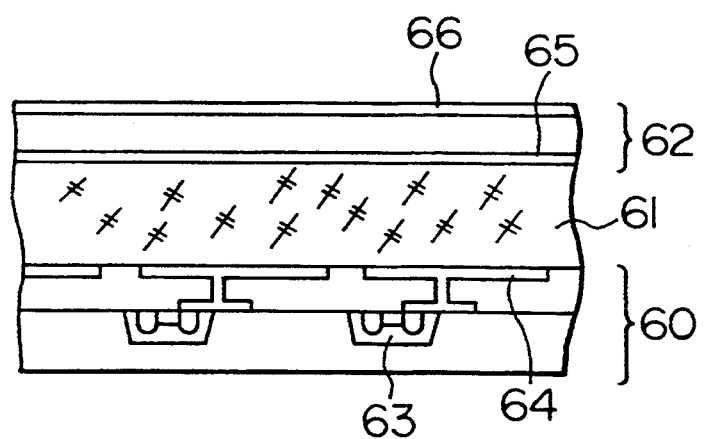
FIG. 3 is a cross-sectional view showing the construction of the liquid crystal panel shown in FIG. 2.

FIG. 3 is a cross-sectional view of the liquid crystal panel. A light-scattering type of liquid crystal 61 is put between two substrates 60 and 62. The lower substrate 60 is a single crystal wafer of silicon. On the wafer, transistors 63 are formed. The source electrode of each transistor is connected to a pixel electrode 64. This pixel electrode is made of metal such as aluminum, etc., which serves as a light reflecting layer. The substrate 62 opposite to the substrate 60 is made of transparent material such as glass, policarbonate, acrylate resin or the like, on the inner surface of which a transparent electrode 65 is disposed. Reflection by the transparent electrode 65 is prevented by controlling a thickness or the like of the electrode 65. Further, in order to prevent worsening in the image quality due to reflection on the surface, there is disposed a reflection preventing layer 66 with multiple layers of dielectric substance on the outer surface of the substrate 62 or a silicon gel layer having substantially the same refractive index between the dichroic prism 14 and it.

Figure 4A:
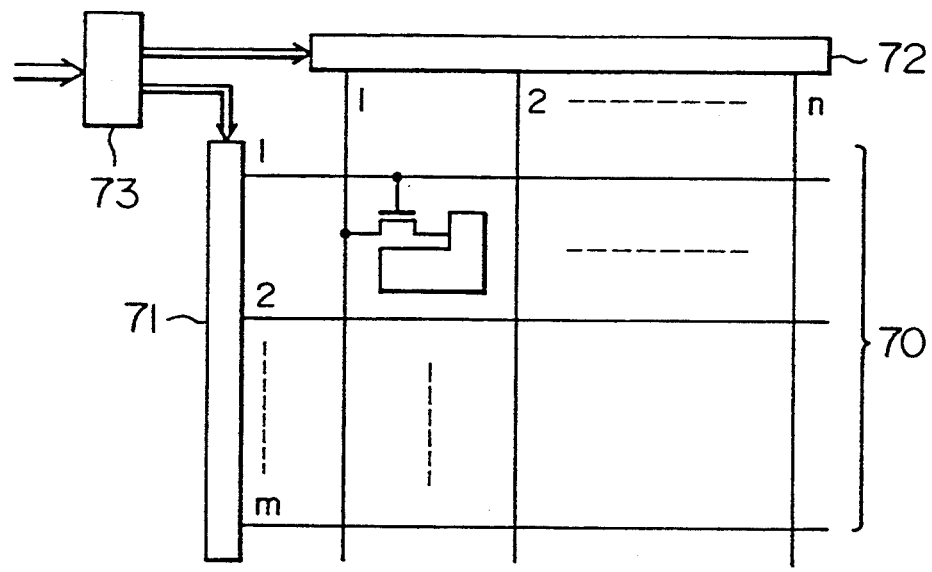
FIG. 4A is a block diagram of a circuit integrated in the liquid crystal panel shown in FIG. 2.

FIG. 4A is a diagram showing the construction of the circuit integrated in the wafer, in which there are circuits 71, 72 and 73 for driving a display section 70 including pixels arranged in a matrix manner. Reference numeral 71 denotes a scanning side driving circuit for time-sequentially giving a gating voltage pulse to a group of row electrodes each connecting gates of the transistors, 72 a signal side driving circuit for time-sequentially giving a group of column electrodes a image signal, and 73 a control circuit for controlling both the driving circuits 71 and 72.

Next a detailed construction of a liquid crystal light valve including the circuits 71, 72 and 73 and the operation thereof will be explained.

Figure 4B:
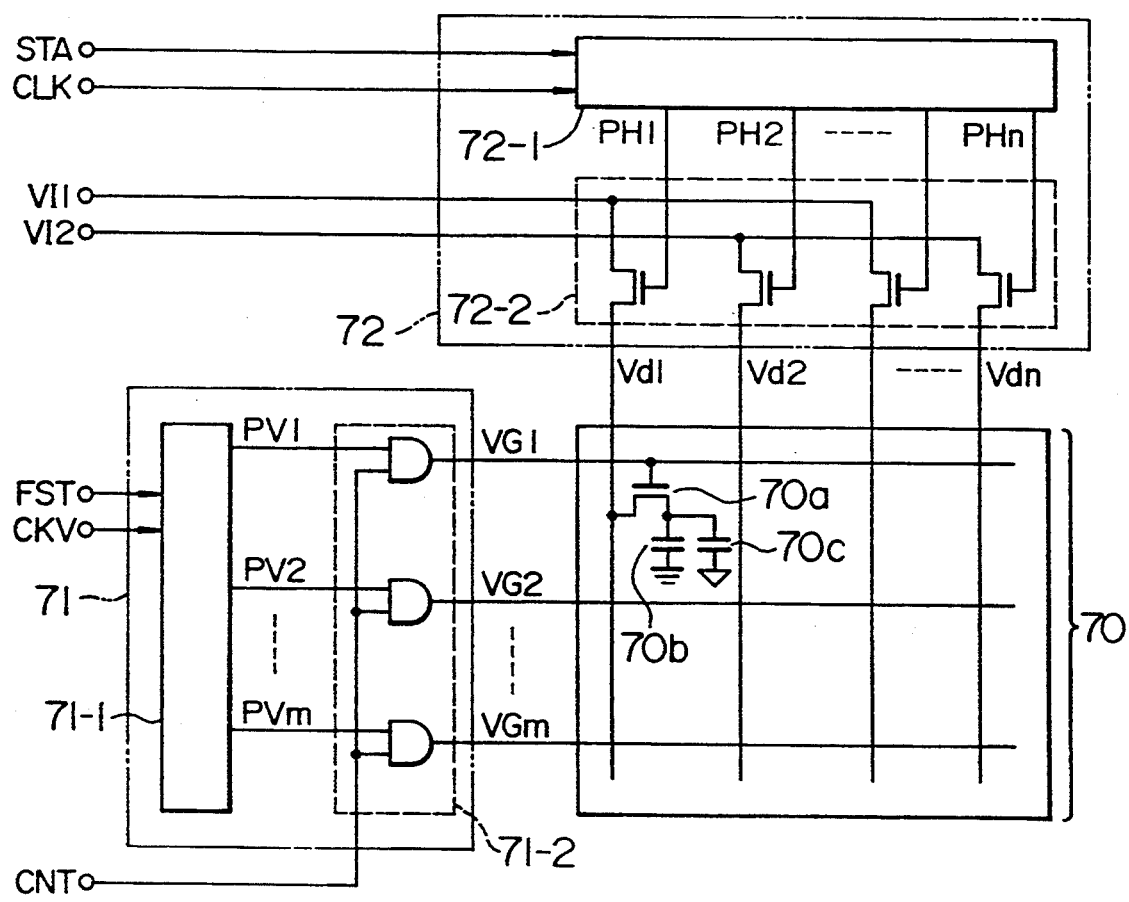
FIG. 4B is a diagram representing the construction of the circuit shown in FIG. 4A in detail.

FIG. 4B shows the circuit construction of the light valve. The light valve includes a liquid crystal display section 70, a horizontal scanning circuit 72-1, a sample circuit 72-2, a vertical scanning circuit 71-1 and an AND circuit group 71-2. Each of the pixels of the liquid crystal display section 70 includes a transistor 70a, a storage capacitor 70b and the liquid crystal capacitor 70c. The pixels are arranged in a matrix form of m rows and n columns to construct the liquid crystal display section. The horizontal and vertical scanning circuits 71-1 and 72-1, the sample circuit 72-2, and the AND circuit group 71-2 are for sequentially driving the display section 70 in units of pixels. These driving circuits are disposed on the monocrystal silicon constituting the display section 70.

The circuit 72-1 inputs a start signal STA and a clock signal CLK from a circuit 73 and outputs sample signals. PH1 to PHn. A switching circuit as the sample circuit 72-2 supplies alternated video signals VI1 and VI2 as drain signals Vd1 to Vdn to drains of the transistors in the display section 70 in synchronism with the sample signals PH1 to PHn. The circuit 71-1 inputs a start signal FST and a clock signal CKV and outputs vertical scanning signals PV1 to PVm. The AND circuit group 71-2 outputs gate signals VG1 to VGm in accordance with a control signal CNT and the signals PV1 to PVm to control scanning timing for the column or gate lines.

Figure 4C:
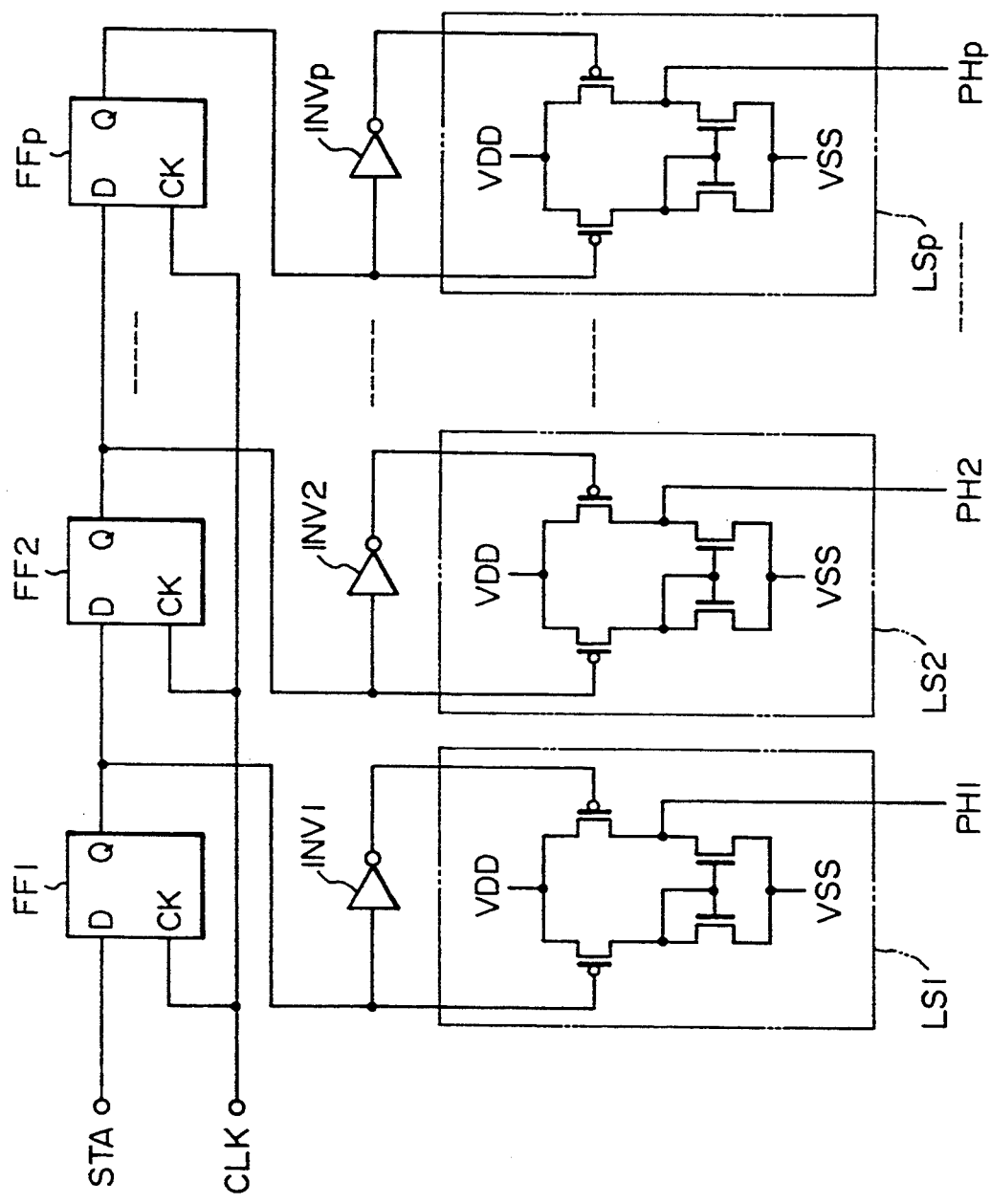
FIG. 4C is a diagram representing a circuit 72 shown in FIG. 4B in detail.

Next, the horizontal and vertical scanning circuits will be described in detail, referring to FIG. 4C. Each of these circuits includes D type flip-flops $FF_1$ to $FF_p$, inverters INV1 to INVp and level converting circuits LS1 to LSp. The p is n for the horizontal scanning circuit and m for the vertical scanning circuit. The flip-flops are connected in series to construct a shift register. A low voltage O-VDD (+5 V) is supplied to the flip-flops FF and the inverters INV and a high voltage VSS(−15 V)-VDD(+5 V) is supplied to the level converting circuit LS.

Figure 4D:
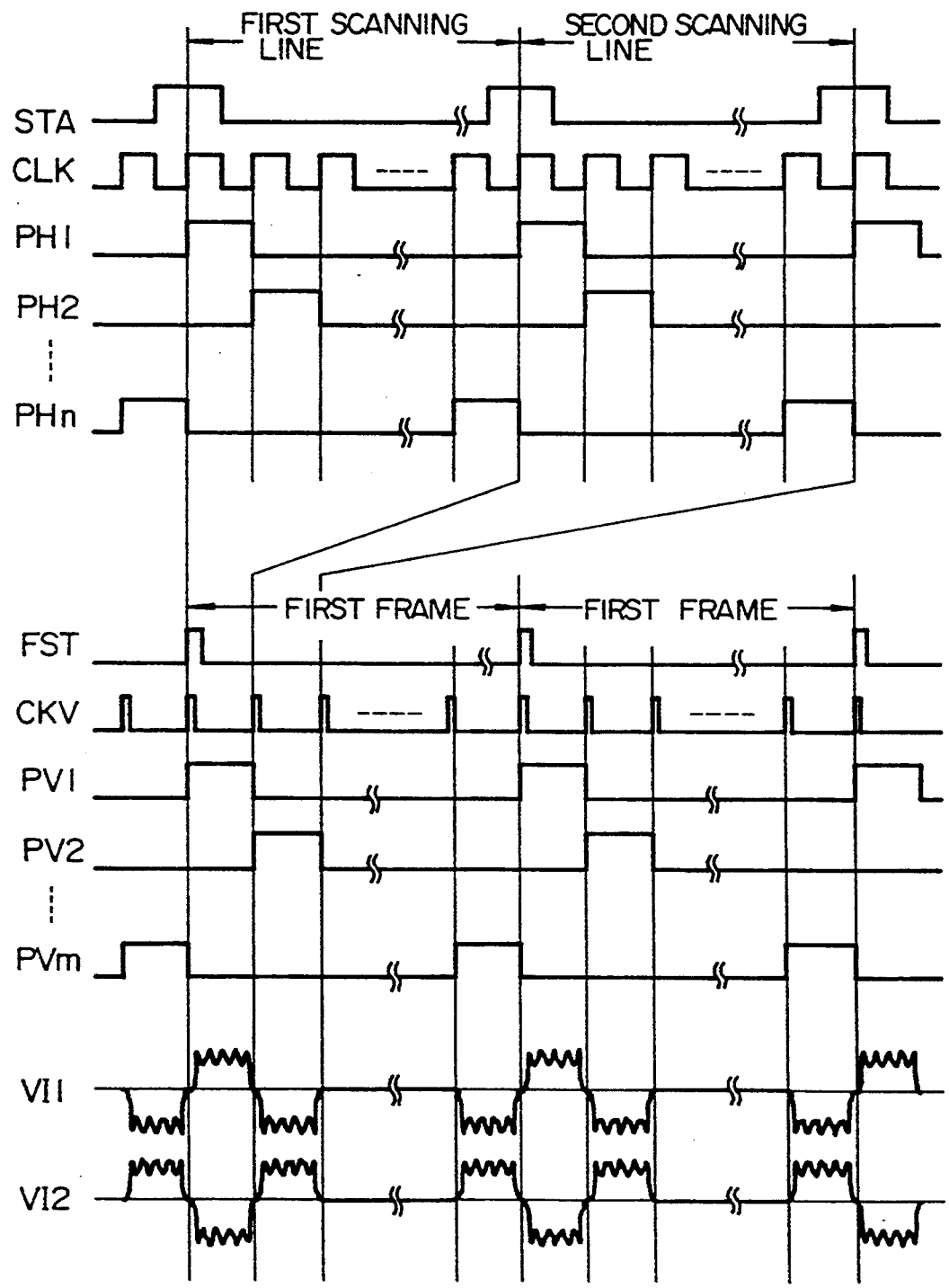
FIG. 4D shows timing charts for explanation of an operation of the liquid crystal panel.

Next, the operation of the liquid crystal light valve will be explained with reference to timing charts shown in FIG. 4D. The start signal STA for the horizontal scanning circuit has, as a period, one horizontal scanning period. The sample signals PH1 to PHn are generated by catching the start signal STA at the rising timing of the clock signal CLK and by sequentially shifting the caught signal in the shift register, using the clock signal CLK.

The start signal FST for the vertical scanning circuit has, as a period, a one-frame scanning period. The vertical scanning signals PV1 to PVm are generated by catching the start signal FST at the rising timing of the clock signal CKV and by sequentially shifting the caught signal in the shift register in synchronism with the signal CKV, similarly to the horizontal scanning circuit.

The video signals VI1 and VI2 have a central voltage equal to a reference potential of the liquid crystal pixels 70b, the polarities thereof are opposite to each other and inverted for every horizontal scanning. These video signals are sampled at the timing of the sample signals from the horizontal scanning circuit and electric charge corresponding to the sampled signal is stored in the storage capacitor 70c.

Figure 5A:
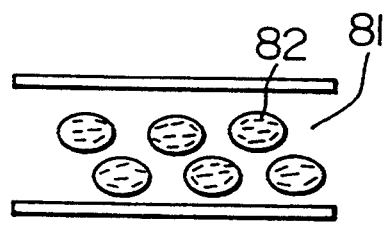
FIGS. 5A and 5B are diagrams for explaining the operation of the liquid crystal panel shown in FIG. 2.
Figure 5B:
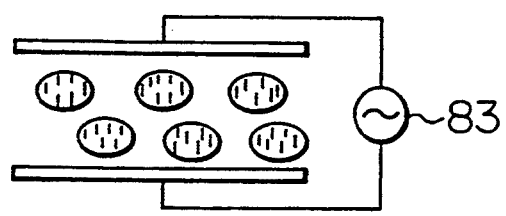

In the present invention, polymer-dispersed-type liquid crystal is used as the light-scattering-type liquid crystal and the operational characteristic thereof will be explained, referring to FIGS. 5A and 5B. The polymer-dispersed-type liquid crystal panel includes a liquid crystal layer so constructed that nematic liquid crystal 82 is contained in an encapsulated manner in transparent organic material 81, e.g., polyvinyl alcohol. When no voltage is applied to a liquid crystal panel, nematic liquid crystal molecules are oriented parallel to the wall of the capsule, as shown in FIG. 5A. Since the liquid crystal molecules have an approximately elliptic cross-sectional construction, there are the liquid crystal molecules each having a minor or short axis of the ellipse with respect to incident light in a vertical direction from an up side to a down side of the figure with a high probability. On the other hand, when a voltage is applied thereto from a driving voltage source 83, since the liquid crystal molecules are oriented so that the major or long axis thereof is directed in the direction of an electric field due to the applied voltage, as shown in FIG. 5B, the incident light comes into the liquid crystal molecules in the major axis direction thereof and thus is transmitted. Therefore, in a polymer-dispersed-type liquid crystal selected so that the refractive index of the organic material 81 and that of the liquid crystal molecules only in the major axis direction are approximately equal to each other, when no voltage is applied thereto, since the refractive indices of the organic material and the liquid crystal are different from each other at the surface of the capsules, the incident light is scattered. On the contrary, when a voltage is applied thereto, since the refractive indices of the organic material and the liquid crystal are approximately equal to each other, no scattering of the incident light takes place and hence a liquid crystal layer is transparent.

In a liquid crystal panel having the construction, using such polymer-dispersed-type liquid crystal, as shown in FIG. 4A, a part of the liquid crystal layer is transparent for pixels, under an electric field of sufficient intensity operated by transistors. Incident light to the liquid crystal panel in a downward direction passes through the liquid crystal layer and is reflected almost completely (in practice about 80 to 90%) by the reflecting layer serving as the pixel electrode. As a result, a part of an image corresponding to those pixels are displayed to be bright on the screen. On the contrary, when no electric field operates to pixels, the incident light is scattered strongly within the liquid crystal layer, so that scattered light doesn't reach the screen, resulting in dark display of a part of the image corresponding to the pixels. Further, since the degree of the scattering varies gradually with increasing the voltage associated with the electric field, intermediate tone display can be made through voltage modulation.

In the first embodiment described above, the polarizing plate, which was inevitable for the TN-type liquid crystal, can be omitted by using the light-scattering-type liquid crystal, and the brightness can be approximately double compared to the case of the TN-type liquid crystal. Also, by using the reflecting-type of liquid crystal panels, the pixel electrodes can be disposed on the transistors and the wiring electrodes, resulting in increasing the efficiency of light utilization. Consequently it is possible to realize a bright display with a lamp of a low electric power consumption, compared to a conventional projection-type display apparatus.

Further, by using the reflection-type projection optical system, the color-separating optical system and the color-combining optical system can be used in common, resulting in down sizing being possible.

Furthermore, owing to the fact that the peripheral driving circuit is integrated on the silicon monocrystal wafer, the number of connecting points with the exterior can be significantly reduced and remarkable effects can be obtained on improvement of the reliability and simplification of mounting, thereby resulting in the down sizing of the apparatus.

Figure 6A:
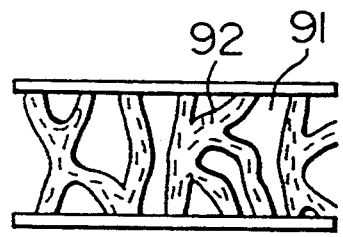
FIGS. 6A and 6B are diagrams for explaining the operation of another liquid crystal panel used for realizing the present invention.
Figure 6B:
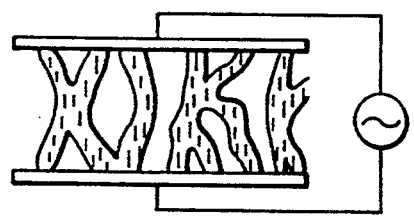

Next, a first modified example of the liquid crystal panel will be explained, referring to FIGS. 6A and 6B. In this modified example, the light-scattering-type liquid crystal is similar to that described in the first embodiment in that nematic liquid crystal 92 is enclosed by organic material 91. However, the nematic liquid crystal is not encapsulated (in an approximately spherical shape), but filled in gaps of the organic material, as shown in FIG. 6A. Although an optical behavior of the liquid crystal under the presence or absence of the electric field is identical to that described in the first embodiment, as apparent from FIGS. 6A and 6B, since many parts of the liquid crystal connect to both the electrodes in the direction of electric field, the driving voltage can be lower than that required for the encapsulated polymer-dispersed-type liquid crystal.

Figure 7A:
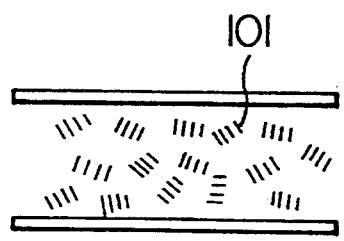
FIGS. 7A and 7B are diagrams for explaining the operation of still another liquid crystal panel used for realizing the present invention.
Figure 7B:
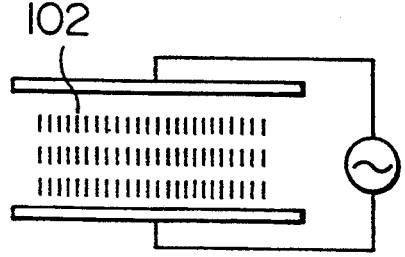

Now a second modified example of the liquid crystal panel will be explained, referring to FIGS. 7A and 7B. A liquid crystal material taking the smectic A phase is used as the light-scattering-type liquid crystal. When no electric field operates thereto, the smectic A phase liquid crystal takes an orientation state called a focal conic structure in which light is scattered. On the other hand, when electric field operates thereto, the liquid crystal takes a homeotropic structure 102, in which the major axes of molecules of the liquid crystal are arranged properly in the direction of the electric field and thus the liquid crystal is in a transparent state. In this way the same display as described above can be achieved. In this modified example, only liquid crystal material is sealed between the electrodes and the panel can be fabricated by a method almost identical to that used for a conventional apparatus using TN-type liquid crystal.

Figure 8A:
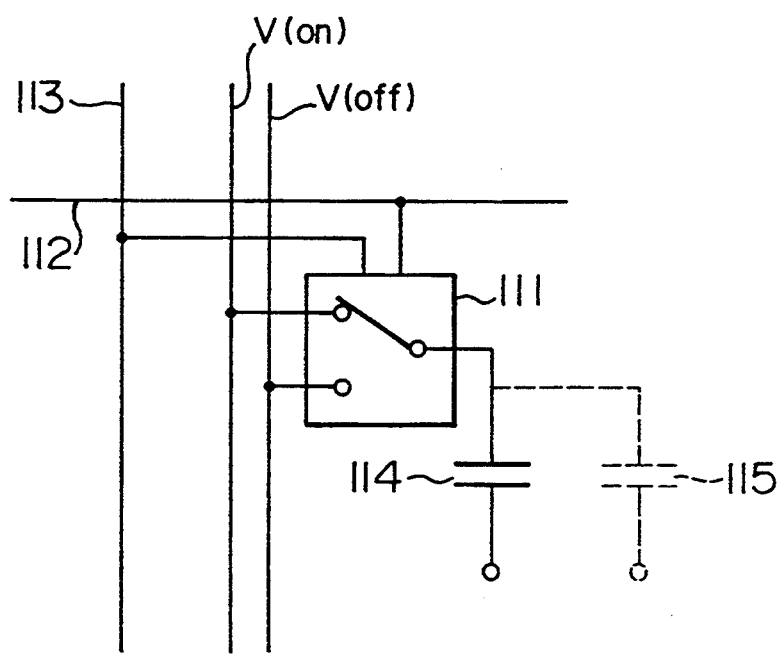
FIG. 8A is a diagram showing a modified example of the equivalent circuit shown in FIG. 2.

Next, a third modified example of the liquid crystal panel will be explained, referring to FIG. 8A. In this modified example a switching circuit 111 for selecting and outputting the of two inputs is provided, for every pixel and formed of a plurality of transistors of each of the pixels. This switching circuit 111 reads out display information inputted from the column electrode 113 in response to a pulse voltage signal from the row electrode 112 and selects either one of the display voltages V(on) or V(off) to drive a pixel 114 of the liquid crystal. Further, if the circuit is constructed so as to hold the display information once read out, until the succeeding pulse voltage arrives, since V(on) or V(off) is always applied to the pixel 114 of the liquid crystal panel, there is no period of time when the circuit is in an opened state which is peculiar to the conventional example, viewed from the liquid crystal panel, and impedance control for the liquid crystal panel can be alleviated. Further, an effect of making the storage capacitor 115 unnecessary can be obtained. Although, in the present modified example, only two-valued display is possible, because a switching circuit having two inputs and one output is used, it is apparent that extension to multi-valued display can be made by increasing the number of inputs of the switching circuit and by increasing the display information and the number of display voltages in correspondence with the increase of inputs.

Figure 8B:
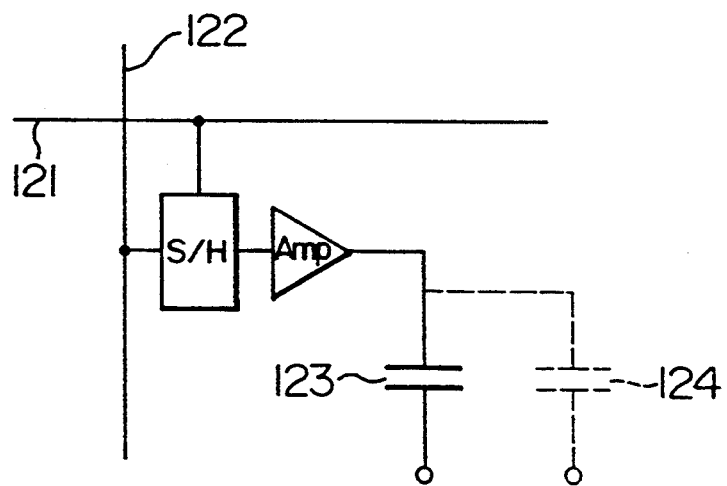
FIG. 8B is a diagram showing another modified example of the equivalent circuit shown in FIG. 2.

Next, a fourth modified example of the liquid crystal panel will be explained, referring to FIG. 8B. In this modified example, each of the pixels has a sample hold circuit S/H and an analogue amplifier Amp. The circuit S/H reads out analogue image information from the column electrode 122 in response to a pulse voltage from the row electrode 121 to hold the same. The analogue amplifier Amp is in charge of amplifying this analogue image information up to a predetermined level to drive a liquid crystal pixel. The liquid crystal pixel 123 is always driven by a voltage source of low impedance similarly to the third modified example and therefore it is possible to alleviate the impedance control for the liquid crystal panel and further to make the storage capacitor 124 unnecessary.

Figure 9:
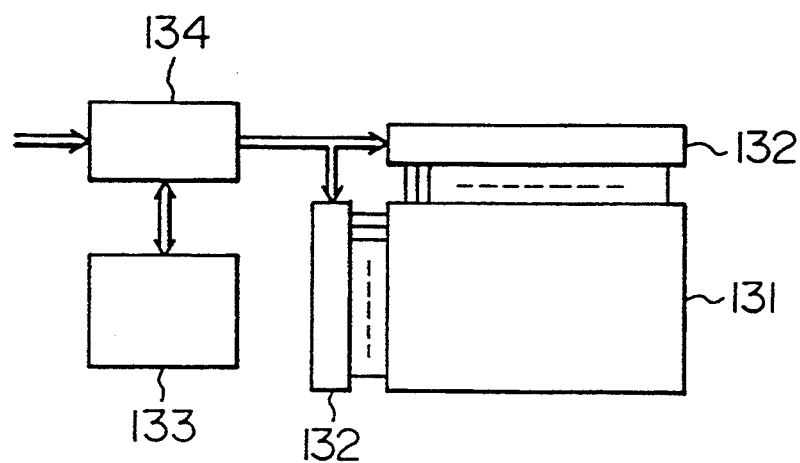
FIG. 9 is a block diagram showing a modified example of the integrated circuit shown in FIG. 4A.

Next, a fifth modified example of the liquid crystal panel will be explained, referring to FIG. 9. In this modified example, not only the display driving section 131 and the peripheral circuit 132 but also a control circuit including a frame memory 133 for storing display information for one screen and a controller for the frame memory are integrated in the silicon monocrystal wafer. By adopting such a construction, an external apparatus, e.g., personal computer is required only, to write display information in the frame memory 133 and is not required to generate control timing signals and to perform high speed transfer of the display information in a time sequence manner.

Figure 11A:
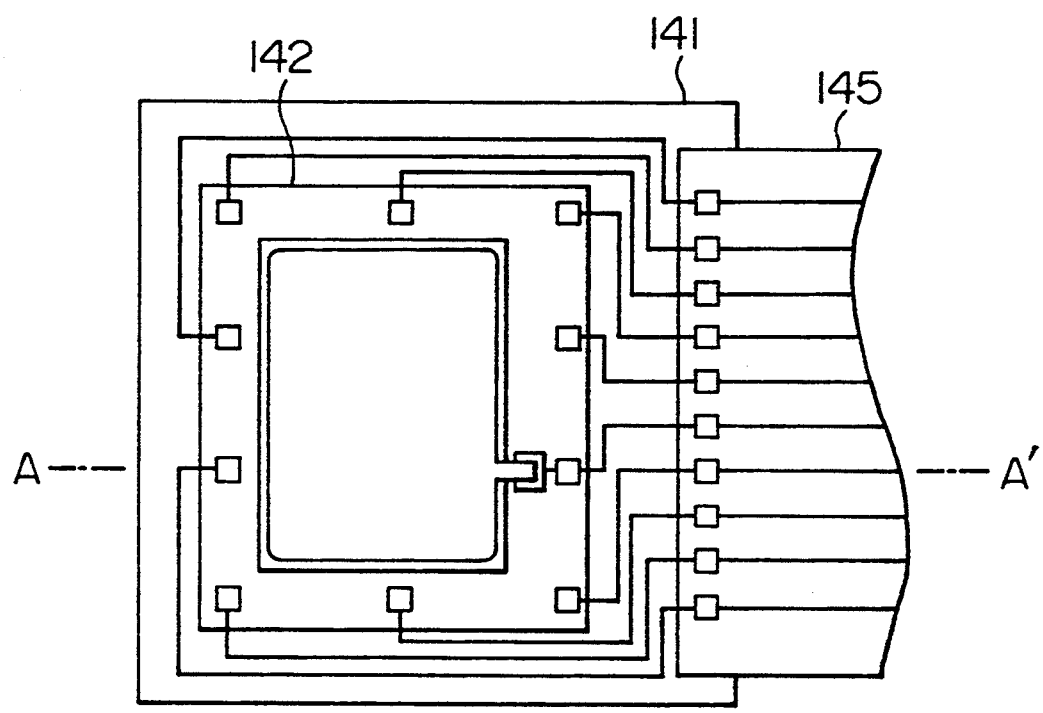
FIGS. 11A and 11B are schematical diagrams showing a state when a liquid crystal panel is mounted on the dichroic prism shown in FIG. 1.
Figure 11B:
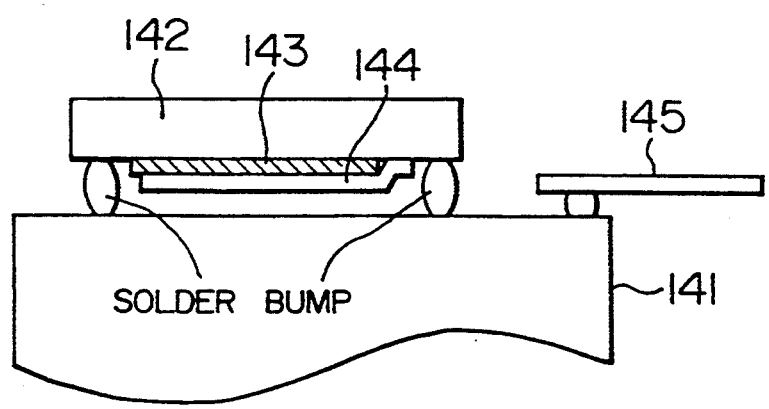

FIGS. 11A and 11B show an example of the method for mounting the liquid crystal panel in the present embodiment. In the example, wiring terminals to the exterior are disposed previously on the dichroic prism 141 serving as the color separating/combining optical system and electric connection with the silicon monocrystal wafer 142 is effected through solder bumps or a silver paste or the like which is obtained by dispersing conductive particles into a material having adhesive property, as shown in FIG. 11B, i.e., on the basis of the chip-on-glass method. It is a matter of course that a liquid crystal layer 143 is located between the prism 141 and the wafer 142, that an opposite electrode 144 is disposed either on the liquid crystal or on the transparent glass and that connection from the prism 141 to the external circuit through the solder bumps is effected by means of a flexible flat cable 145. By adopting such a mounting method, packaging of the liquid crystal panel can be simplified and hence down sizing of the apparatus can be intended.

Figure 10:
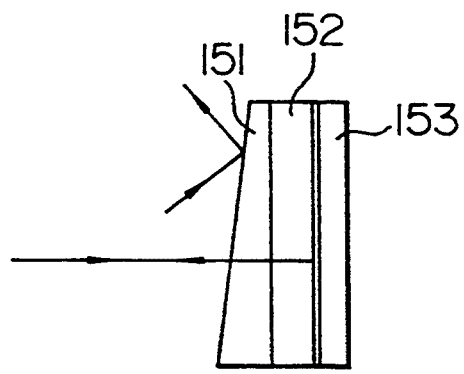
FIG. 10 is a cross-sectional view of a modified example of the liquid crystal panel shown in FIG. 3.

Next, a sixth modified example of the liquid crystal panel will explained, referring to FIG. 10. In this modified example, a glass substrate 151 of the liquid crystal panel on the incident light side is inclined with respect to the optical axis. In this way, light components which are reflected by the surface of the glass substrate 151 and which would originally lowers the display quality, are deviated from the optical axis so that they cannot arrive at the screen. Therefore worsening of the display quality can be prevented. Also, light passing through the liquid crystal layer 152 in the transparent state and reflected by the surface of the silicon monocrystal wafer propagates along the predetermined optical axis and hence the display operation is not hindered.

Next, a first modified example of the first embodiment of the present invention will be explained referring to FIG. 12. In this modified example, a half mirror 161 is used instead of the reflecting mirror, white light emitted from a light source 162 is transformed to approximately parallel light by a lens 163. Approximately 50% of this parallel light is reflected by the half mirror 161 to the left of the figure and income to a dichroic prism 164 serving as the color separating/combining optical system. The operations of the dichroic prism and liquid crystal panels 165-R, 165-G and 165-B are identical to those described in the first embodiment. Light components reflected by the liquid crystal panels are combined and income again in the half mirror 161. Thus, approximately 50% of the incident light to the half mirror 161 is projected on a screen by a projection lens 166. Although the present optical system has an optical loss, the optical system can be simplified and a remarkable effect of down sizing of the apparatus and lowering in the price can be obtained.

Next, a second modified example of the first embodiment of the present invention will be explained. In general, in the case where transistors, etc. are formed on a silicon wafer, flatness of the surface of the wafer is worsened. For this reason, even if the pixel electrode is made of aluminium having a high reflectivity, light is scattered on the surface of the electrode and therefore effective light amount projected on the screen through the projection lens is reduced. In the present modified example, in order to prevent lowering in the efficiency of light utilization due to unevenness of the surface of the pixel electrode as described above, the scan lines of the screen are divided into odd scan lines and even scan lines and separate liquid crystal panels are used therefor.

Figure 13A:
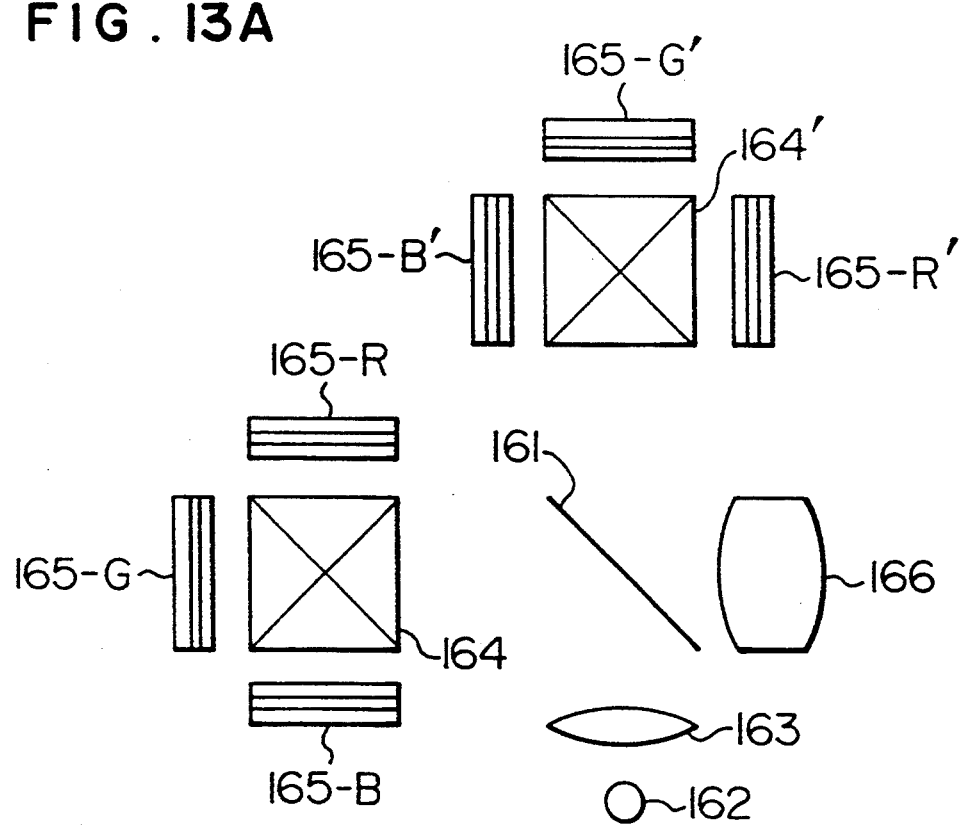
FIG. 13A is a diagram showing the construction of a second modified example of the present invention.
Figure 13B:
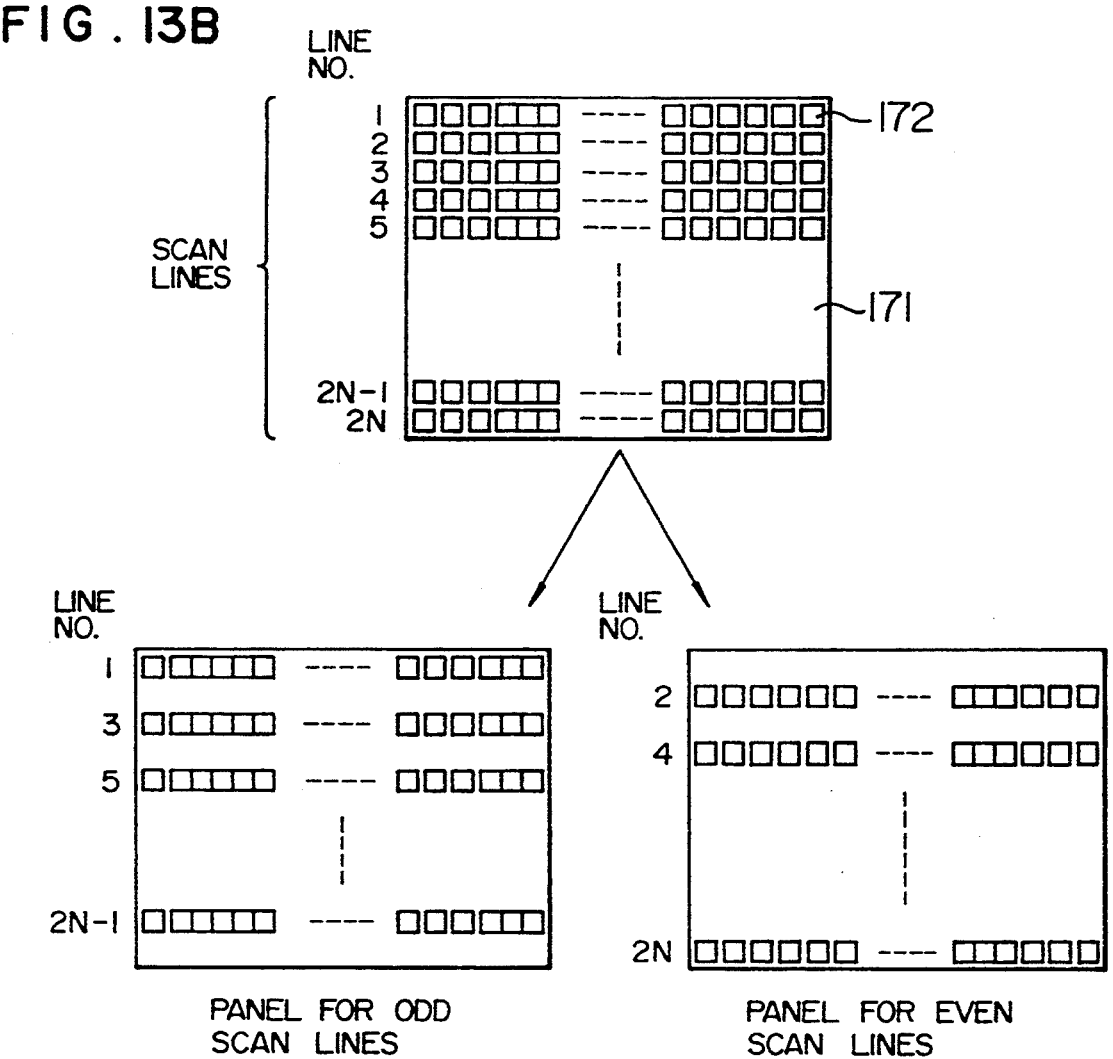
FIG. 13B is a diagram representing a method for dividing a liquid crystal panel into a panel for odd scan lines and a panel for even scan lines in the modified example shown in FIG. 13A.
Figure 13C:
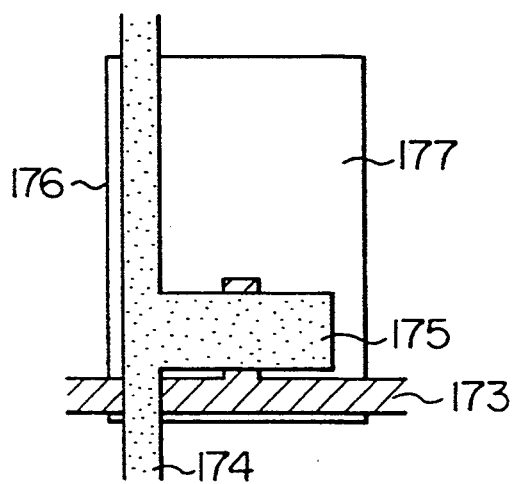
FIGS. 13C and 13D are diagrams showing circuit patterns corresponding to pixels in the panels for odd and even scan lines, respectively.
Figure 13D:
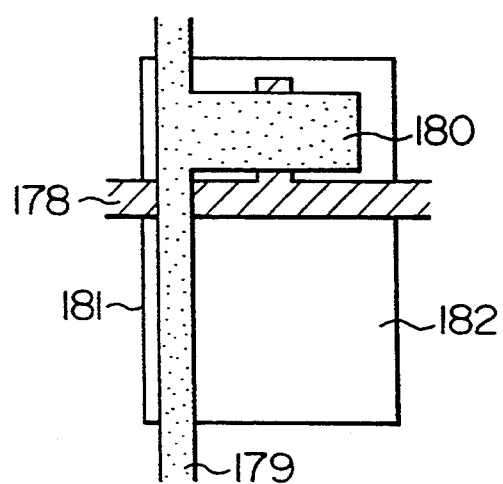

A dividing state of the scan lines of the screen will be explained, referring to FIG. 13B. FIGS. 13C and 13D are a diagrams showing the constructions of the pixels on the panels for odd and even scan lines obtained by the division, respectively. The screen 171 is so constructed that a number of pixels 172 are arranged in a two-dimensional matrix form. The screen 171 has scan lines from Line No. 1 to 2N. Here the scan lines are divided into two groups of the odd scan lines and the even scan lines. That is, the panel for odd scan line is constructed by only the pixels on the odd number scan lines among the pixels constituting the screen 171. In FIG. 13B, on the panel for odd scan line, the scan line numbers are 1, 3, 5, —, 2N-1. On the contrary, the panel for even scan lines is constructed by only the pixels on the even number scan lines. In FIG. 13B, on the panel for even scan lines, the scan line numbers are 1 2, 4, —, 2N. Each of the pixels on the liquid crystal panels obtained by division occupies an area twice as large as the area occupied before the division. In each of the panels for odd and even scan lines, circuit elements such as transistors, etc. are formed on the portion where a pixel is removed by the division.

The positional relation between the pixels and the transistors will be explained, referring to FIGS. 13C and 13D. In FIG. 13C, a transistor portion 175 is formed at the intersection of a scan line electrode wiring 173 and a signal electrode wiring 174. Further a pixel electrode 176 made of a material or the like having high reflectivity such as aluminum is disposed so as to cover a pattern of the transistor portion 175 and parts of the patterns of the scan line electrode 173 and the signal electrode 174 (in the figures this situation is shown in a clairvoyant state so that the positional relation of the transistor portion 175, etc. is clearly seen). In the panel for odd scan lines, a flat portion 177 of the pixel electrode corresponds to each pixel on each of the odd scan lines of the screen before the division (upper half in the figure) and the transistor portion 175 or the like is arranged in a part corresponding to pixels on each of the even scan lines before the division. In FIG. 13D, a transistor portion 180 is formed at the intersection of a scan line electrode wiring 178 and a signal electrode wiring 179. The transistor portion 180 and a flat portion 182 for each pixel in the even scan lines are arranged in reverse to the case in the odd scan lines.

As described above, the flat portion can always be obtained in the respective pixel electrode portions by dividing the scan lines of the screen into the odd and even scan lines and the area thereof is approximately equal to that of the each pixel of the screen before the division. For this reason light can be satisfactorily reflected and thus it is possible to realize a liquid crystal projector having a high efficiency of light utilization.

A display apparatus capable of projecting a color image on a screen, using the two panels for odd and even scan lines will be explained, referring to FIG. 13A. The fundamental construction of this display apparatus is identical to that of the display apparatus shown in FIG. 12. Therefore the identical constituent parts are indicated by same reference numerals and explanation thereof will be omitted.

Figure 12:
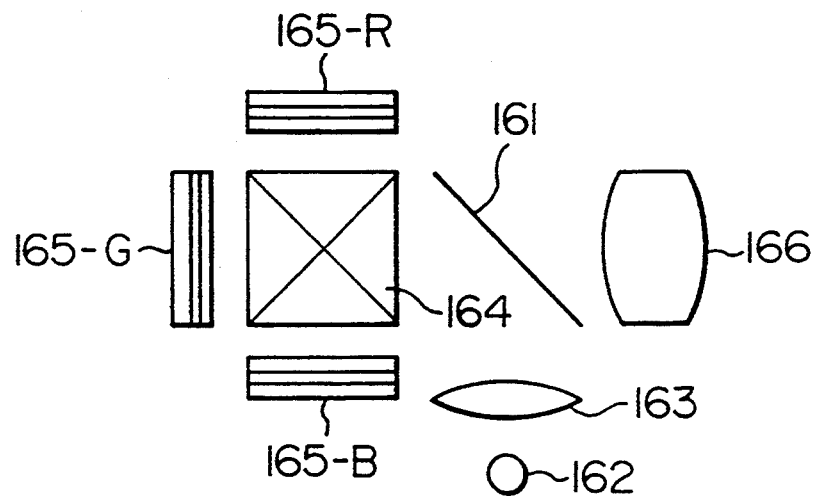
FIG. 12 is a diagram showing an optical system of a projection-type display apparatus, in which a half mirror is used instead of the reflecting mirror in the display apparatus shown in FIG. 1.

In this display apparatus, in addition to the display apparatus shown in FIG. 12, liquid crystal panels 165-B', 165-G' and 165-R' and a dichroic prism 164' are disposed on the transmission side of the half mirror 161. The arrangement of the liquid crystal panels 165-B', 165-G' and 165-R' and the dichroic prism 164' is identical to that of the display apparatus shown in FIG. 12. However, an image obtained from the liquid crystal panels 165-B' is inversed in the left and right sides, compared to that obtained from the liquid crystal panel 165-B. This can be achieved by scanning horizontally the liquid crystal panel 165-B' from the right side to the left side, when the liquid crystal panel 165-B is scanned horizontally from the left side to the right side.

About a half of the light emitted from the light source 162 is reflected by the half mirror 161 and income into the dichroic prism 164, while the remaining half passes through the half mirror 161 and is income into the dichroic prism 164'. An odd scan line image and an even scan line image are outputted from the dichroic prisms 164 and 164', respectively, on the basis of the incident light to the prisms 164 and 164'. The odd scan line image passes through the half mirror 161, while the even scan line image is reflected by the half mirror 161. In this way an image for all the scan lines is produced on the projection lens 166 side after the half mirror 161.

As apparent from the above description, contrarily to the fact that in the display apparatus shown in FIG. 12 only 50%×50%=25% of the light emitted from the light source 162 is utilized it is possible to utilize the light with a higher efficiency, i.e., the efficiency of 50% by using this display apparatus.

Although, in this example, a half mirror is used, it is possible to use a beam splitter instead thereof. Since this can be done easily by a person skilled in the art, explanation thereof will be omitted. Further it is also possible to dispose two display apparatuses shown in FIG. 12 for the odd scan line image and the even scan line image, respectively, and to combine those image on a screen so as to provide a color image.

Figure 14:
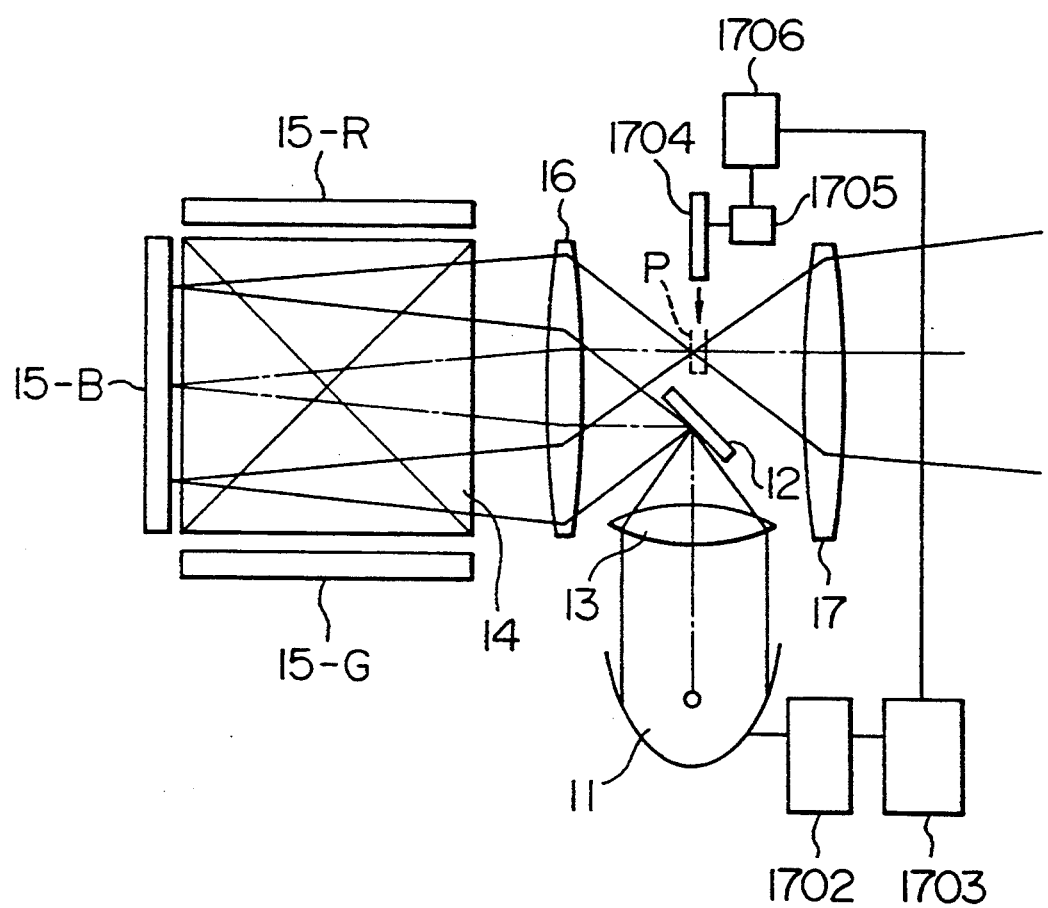
FIG. 14 is a diagram showing the construction of a projection-type display apparatus having a lamp position adjusting function according to the present invention.

Next, a second modified example of the first embodiment of the present invention will be explained, referring to FIG. 14. FIG. 14 shows a projection-type liquid crystal display apparatus, in which a section for realizing a lamp position adjusting function is integrated. In this figure the constituent parts identical to those shown in FIG. 1 are shown by same reference numerals.

In the present example, the lamp position adjustment in exchanging the lamp 11 serving as a light source is effected automatically.

Since it is thought that the lamp 11 is the exchange part having the shortest life in the present optical system, the exchange thereof is inevitable. Since this exchange is accompanied by usually complicated position adjusting work it was necessary that it is effected by a specialist. However, the present modified example is provided with a position fine-adjusting mechanism 1702 for adjusting finely the position of the lamp, a driving circuit 1703 for driving the mechanism 1702, a light detecting section 1704, a light detecting section moving mechanism 1705 and a light detecting section driving circuit 1706.

Now, the operation thereof will be explained. In the present optical system a light focusing point is located at a point P within the optical system. It is sufficient to adjust the position of the lamp in exchanging it so that the light focusing point is positioned accurately at this point P. For this reason, the system is so constructed that the light detecting section 1704 can be positioned at the point P. Consequently the moving mechanism, which moves the light detecting section 1704 located usually at a position where the section 1704 doesn't obstruct the optical path, to the point P in exchanging the lamp, and the driving circuit 1706 therefor are driven. The section 1704 includes a light detecting element smaller than the light focusing spot at the point P. When the light amount detected by this light detecting element is highest, this means that light is focused just at this point P. At this time a light detection output is sent to the driving circuit 1703 for driving the adjusting mechanism 1702 to adjust finely the position of the lamp.

Since it is usually difficult to discern the greatest light amount, it is possible also to store in advance the optimum light amount region, depending on the used lamp 11 and to terminate the adjustment, when the detected light amount is in the light amount region described above. Further it is also possible to display the output of the photodetector and the optimum light amount region and to construct the adjusting mechanism so as to be driven manually so that even an amateur can effect easily the fine adjustment according to the display. In this way, when the light detecting section 1704 is returned to its original position after having adjusted automatically or manually the position of the lamp, where the section 1704 doesn't obstruct the optical path so that the system can perform the function as a display apparatus. Further, since displacement of the photodetector is determined unambiguously, if the optical system is determined, it can be moved manually. The present photodetector can also be used for adjusting the optical axis, etc. The adjusting mechanism 1702 capable of being moved one-, two- or three-dimensionally can be used. Furthermore, although, in the present modified example, a reflecting-type liquid crystal display apparatus has been described, it is a matter of course that in a transmitting-type liquid crystal display apparatus. The lamp position adjusting photodetector according to the present invention can also be used, if the light focusing point is disposed within the apparatus, so that lamp exchange or readjustment of a misaligned optical axis can be easily effected. Although, in the modified example described above, the light amount to be detected by the photodetector is supposed, light intensity or the like may be measured. Since lamp exchange can be effected easily according to the modified example described above, it is suitable for use at a place, where there is no specialist, such as domestic use.

Hereinbelow a projection-type display apparatus according to a second embodiment of the present invention will be explained in detail, referring to the attached drawings.

Figure 15:
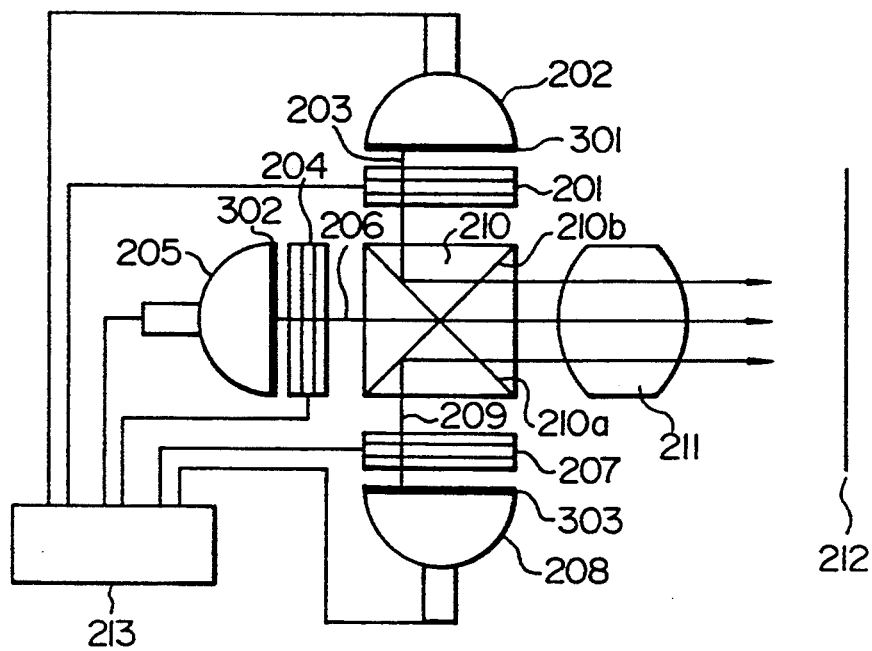
FIG. 15 is a block diagram showing a projection-type display apparatus according to a second embodiment of the present invention.

FIG. 15 shows the second embodiment of the present invention and the projection-type display apparatus according to the present embodiment is composed of three liquid crystal light valves 201, 204, 207, three CRTs 202, 205, 208 acting as plane light sources, a dichroic prism 210, a projection lens 211, and a control system 213. It includes further a screen 212 as an attached installation.

The liquid crystal light valves 201, 204 and 207 for red, green and blue are controlled in accordance with image signals for red, green and blue images, which are supplied by the control system 213, to intensity-modulated red light 203, green light 206 and blue light 209 emitted by the fluorescent surfaces of the CRTs 202, 205 and 208 for red, green and blue which are disposed sufficiently closely to the liquid crystal light valves 201, 204 and 207, in order to generate red, green and blue images, respectively.

The red light 203 and the blue light 209 thus intensity-modulated are reflected by interference films 210a and 210b of the dichroic prism 210 and income into a projection lens 211. The intensity-modulated green light 206 passes through the dichroic prism 210 and is income into the projection lens 211. As the result, three-colored light of the red light 203, the green light 206 and the blue light 209 is combined or synthesized and projected to the screen 212 by the projection lens 211 so that a color image is displayed on the screen 212.

The liquid crystal light valves 201, 204 and 207 and the CRTs 202, 205 and 208 are arranged sufficiently closely to each other, respectively. However, in order that lights emitted by the different CRTs 202, 205 and 208 are income into the projection lens 211 with a further higher efficiency, the interference film 301 for red is attached to the tube surface of the CRT 202 for red;

the interference film 302 for green is attached to the tube surface of the CRT 205 for green; and the interference film 303 for blue is attached to the tube surface of the CRT 208 for blue.

Consequently, according to the present embodiment the efficiency of the light utilization is high and it is possible to reproduce easily a sufficiently bright color image.

In the present embodiment, dispersed-type liquid crystal light valves in which thin film transistors (TFT) are incorporated, are used for the liquid crystal light valves 201, 204 and 207 modulating the different colors. Therefore the construction and the principle of the dispersed-type liquid crystal light valve will be explained, referring to FIGS. 16A and 16B.

Figure 16A:
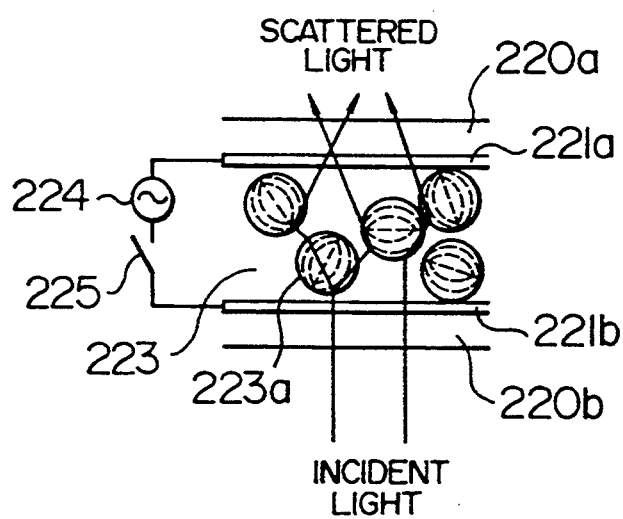
FIGS. 16A and 16B are diagrams for explaining the operation of a dispersed-type liquid crystal panel in the second embodiment of the present invention.
Figure 16B:
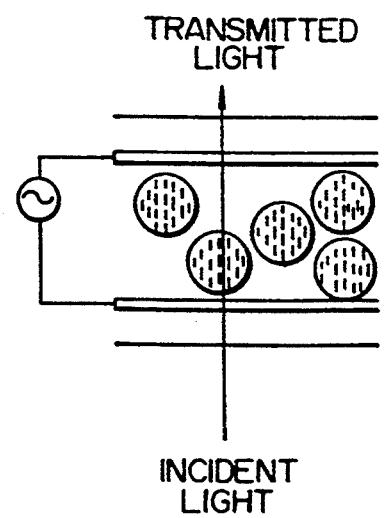

As shown in FIG. 16A, a dispersed-type liquid crystal light valve is so constructed that a liquid crystal layer 223 including a number of liquid crystal grains 223a is sandwiched between a transparent substrate 220a having a transparent electrode 221a and that a transparent substrate 220b having similarly a transparent electrode 221b, which is opposite to the former, and a signal source 224 and a switch 225 are connected between these transparent electrodes 221a and 221b. Since the many liquid crystal grains 223a are oriented at random, when the switch 225 is turned-off so that no electric field is generated in the liquid crystal layer 223, light income into the liquid crystal layer 223 at this time is scattered, as shown in the figure and therefore the liquid crystal light valve holds its opaque state. On the contrary, when the switch 225 is turned-on and the electric field by the signal source is generated in the liquid crystal layer 223 between the transparent electrodes and when the voltage corresponding to this electric field exceeds a certain voltage $V_1$, all the liquid crystal molecules in each of the liquid crystal grains within the liquid crystal layer 223 are aligned in the direction of the electric field. In this way the incident light passes therethrough and thus the liquid crystal light valve becomes transparent. That is, this dispersed-type liquid crystal light valve is switched-over between the opaque state and the transparent state, depending on the presence or absence of the signal voltage, and thus performs a light valve function. Further, when the applied voltage is controlled at values lower than $V_1$, the degree of the scattering can be controlled. As the result, the light valve can also display intermediate tones by using a voltage signal modulated by the image signal as the signal source 224 and thus act as an image reproducing device.

Since this dispersed-type liquid crystal light valve requires no polarizing plate, it has a high efficiency of light utilization. Further, in the present embodiment as described previously, an interference film for red 301 is stuck or laminated on the tube surface of the CRT for red 202; an interference film for green 302 is stuck on the tube surface of the CRT for green 205; and an interference film for blue 303 is stuck on the tube surface of the CRT for blue 208. As the result, a collimator lens effect is given to the front glass part of each of the CRT. Therefore, no generated light is uselessly dispersed, which increases remarkably the efficiency.

Figure 17A:
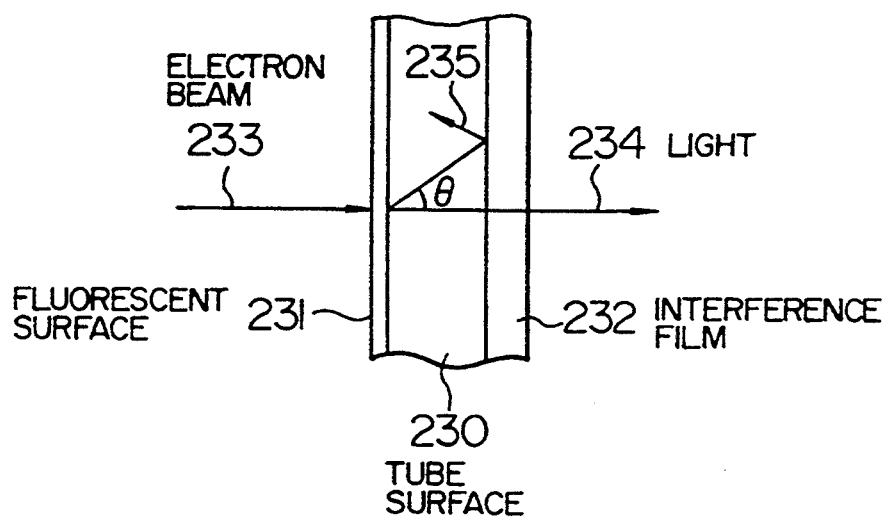
FIGS. 17A and 17B are diagrams for explaining the construction and characteristics of an interference film, respectively, used in the second embodiment of the present invention.

Next the operation of the interference film stuck on the tube surface of each of the CRTs will be explained, referring to FIGS. 17A and 17B. As shown in FIG. 17A, a fluorescent plane 231 is disposed on the inner surface of the face plate (light emitting plate) 230 of the CRT and the interference film 232 is stuck on the surface opposite to the fluorescent plane 231, when the fluorescent plane 231 is irradiated with an electron beam 233, the fluorescent plane 231 emits fluorescence at specified wavelengths. In the case of the CRT for red, light is emitted principally in a red wavelength region and in the case of the CRT for green, light is emitted principally in a green wavelength region. Further, in the case of the CRT for blue, light is emitted principally in a blue wavelength region. This light is emitted by each of the fluorescent planes 231 over a wide angular region. The interference film 232 is composed of a multi-layered evaporation film of a dielectric substance having a refractive index different from that of glass material constituting the face plate 230 and it can have an incident angle dependency concerning its transmission characteristics for light having a predetermined wavelength. For example, the light valve can be so constructed that light 234 emitted perpendicularly to the fluorescent plane 231 is almost transmitted without any loss by the interference film 232, but light 235 emitted by the fluorescent plane 231 in a certain direction forming an angle $\theta$ with the direction perpendicular to the surface thereof is reflected by the interference film 232.

Figure 17B:
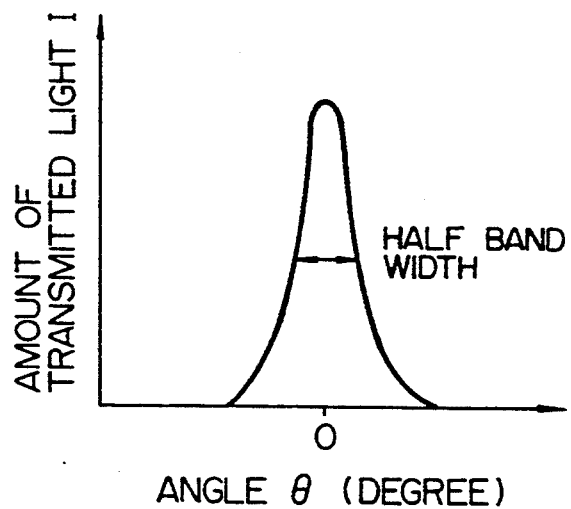

FIG. 17B shows the relation between the angle $\theta$ and the light amount transmitted via the interference film 232 at this time. Light emitted over a wide angular region is transformed by the interference film 232 into light spread only over a narrow angular region. Consequently light is income into each of the liquid crystal light valves 201, 204 and 207. Thus it is possible to suppress the loss to the minimum and to obtain a color image having a high brightness. Therefore, according to the present embodiment, it is possible to realize a satisfactorily long life by using cathode ray tubes as light sources. Further, since different cathode ray tubes independent from each other are used for different colors, the optical system for separating the light from the source into different colors becomes unnecessary and thus down sizing of the optical system can be realized.

Furthermore, according to the present embodiment since emission intensity for different colors can be controlled independently from each other by controlling electron beam current for each of the CRTs 202, 205 and 208, it is possible to effect color adjustment extremely easily.

Besides, although dispersed-type liquid crystal light valves are used in the present embodiment, twisted-nematic-type liquid crystal light valves or supertwisted-nematic-type liquid crystal light valve can be used as well instead thereof. Further the shown positional relation between the different colors is only an example and it can be modified arbitrarily. It is a matter of cause that it is possible to combine light by using a combination of dichroic mirrors instead of a dichroic prism, too.

Figure 18:
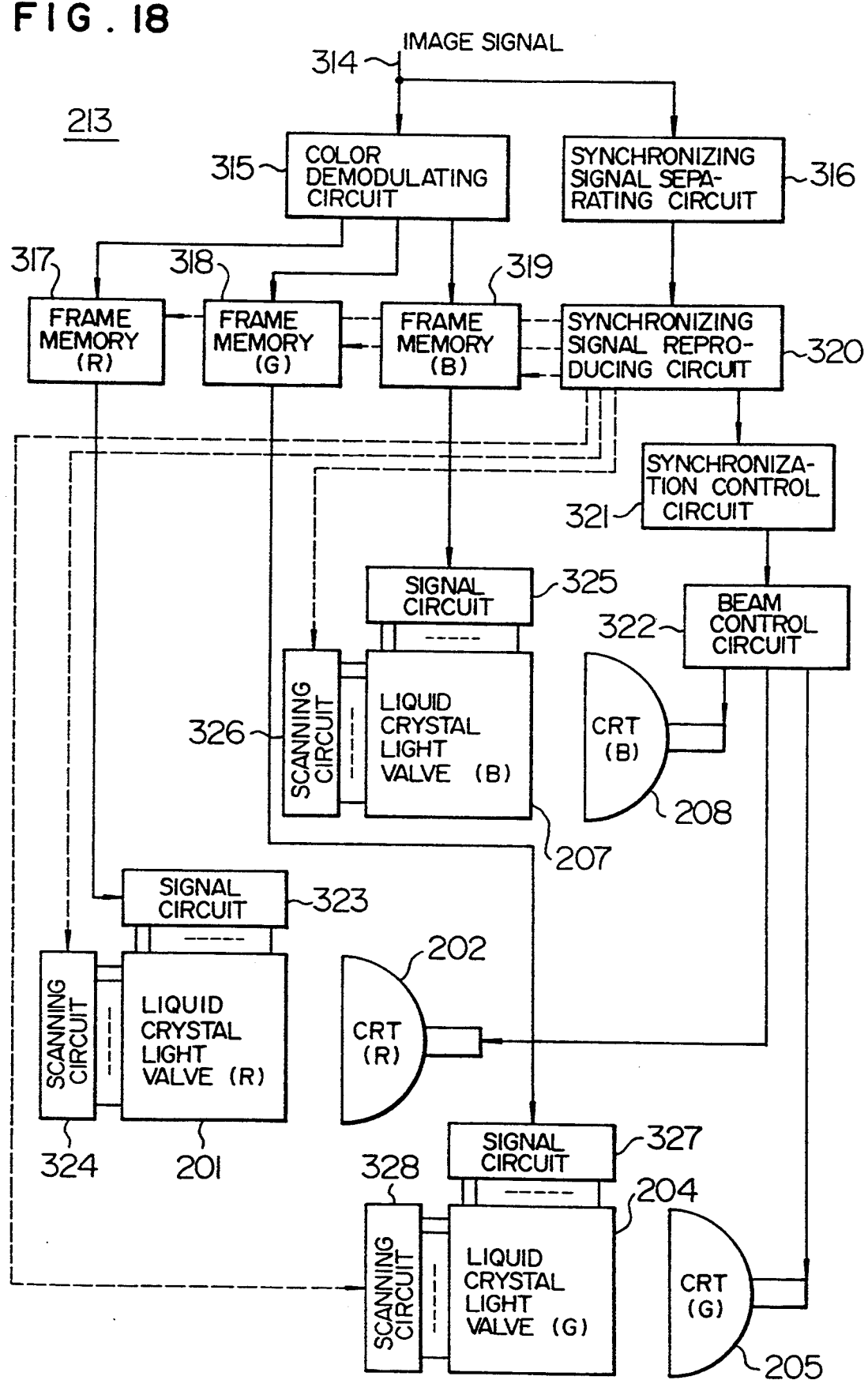
FIG. 18 is a block diagram showing a control system shown in FIG. 15.

Next the circuit construction of the control system 213 will be explained, referring to FIG. 18.

An image signal 314 received from broadcast electromagnetic wave or inputted from a video deck, a video disk or another arbitrary signal source is at first supplied to a color demodulating circuit 315 to be converted there into different color signals of red, green and blue, which correspond to the three primary colors. The color signals obtained by this conversion are stored in frame memories 317, 318 and 319 for every frame in the form of digital data, respectively. Further, the image signal 314 is also inputted to a sync signal separating circuit 316 by which a reference sync signal component for the different signals is separated therefrom, and a sync signal is generated by a sync signal reproducing circuit 320.

Red image signal data is inputted from a frame memory 317 controlled by the reproducing circuit 320 to a signal circuit 323 for controlling the liquid crystal light valve for red 201. The light valve 201 is controlled there by the signal circuit 323 and a scanning circuit 324 to reproduce a red image. Further the sync signal generated by the reproducing circuit 320 is converted into horizontal and vertical scanning signals by a synchronization control circuit 321 and in addition supplied to a CRT for red 202 disposed, adjacent to the light valve 201, through a beam control circuit 322 to control light emission in a raster form in synchronism with reproduction of the red image from the liquid crystal light valve 201 so as to drive it as a red plane light source. In the same way, the liquid crystal light valves 204 and 207 for green and blue are controlled by signal circuits 327 and 325 as well as scanning circuits 328 and 326 to reproduce a green image and a blue image and at the same time light emission by CRTs 205 and 208 for green and blue is controlled in synchronism with reproduction of the green image and the blue image from the liquid crystal light valves 204 and 207 for green and blue, respectively.

Consequently the three liquid crystal light valves 201, 204 and 207 reproducing the different color images independently from each other, corresponding to the three primary colors, and the three CRTs 202, 205 and 208 emitting light of different colors corresponding to the three primary colors are synchronously controlled by this control system 213, respectively, to reproduce a color image on the screen 212.

Light emission by each of the CRTs 202, 205 and 208 in the present embodiment is effected by scanning the fluorescent plane in a raster scan form with an electron beam. Consequently a light emitting point on the CRT corresponding to a pixel on each of the liquid crystal light valves 201, 204 and 207 emits light only once during one frame. On the other hand, a liquid crystal light valve using TFTs is scanned by the line sequential scanning method and pixel information is held, until it is selected to be updated. Consequently, in an image reproducing apparatus using usual CRTs, a light emitting portion on the fluorescent plane thereof represents image information itself. On the contrary, the CRTs used in the present embodiment are used only as light sources. Increase in the total brightness is realized by increasing the current intensity of the electron beam to increase the area emitting light for every scanning and this will be explained around the light emitting state of the CRT, referring to FIGS. 19A to 19D.

FIG. 19A enlargingly shows a part of the pixels of the liquid crystal light valve. The electron beam of the CRT corresponding thereto is swept from the left to the right and downward in the order of a, b and c. The pixel pitch P is about, e.g., 64 μm for a liquid crystal light valve having a size of 2 in. measured along a diagonal. The current intensity of the electron beam of the CRT is increased so that the diameter of the electron beam is about 120 μm, which is twice as large as the pixel pitch. In this way, when the diameter of the electron beam is increased with respect to the size of a pixel in the corresponding liquid crystal light valve, the light emitting portion on the fluorescent plane of the CRT is enlarged so that pixels on a plurality of lines are irradiated simultaneously at each instant.

Now, when a pixel, which is hatched in the FIG. 19A, is considered, there is only one scanning signal selecting this pixel for every frame, as shown in FIG. 19B. The transmissivity at this pixel is held, until a new selecting signal is next applied thereto, as shown in FIG. 19C. On the other hand, the CRT is scanned downward in the order of a, b and c and the light emitting portion is moved in this direction. As the result, the light emitting portion passes through the hatched pixel successively three times so that the amount of transmitted light is increased by a factor of about 2 with respect to that obtained when it is scanned separately in the direction a, b and c. Consequently, according to the present embodiment an extremely bright display image is easily obtained and it is possible to realize the projection-type color display apparatus having a small size, a high brightness and a long life.

Such a liquid crystal light valve by the TFT driving method is fabricated at a relatively high cost because of a low yield at present. Therefore a modified example of the second embodiment, by which the number of used liquid crystal light valves is reduced so that increase in the cost is suppressed and that further down sizing is made possible, will be explained below.

Figure 20:
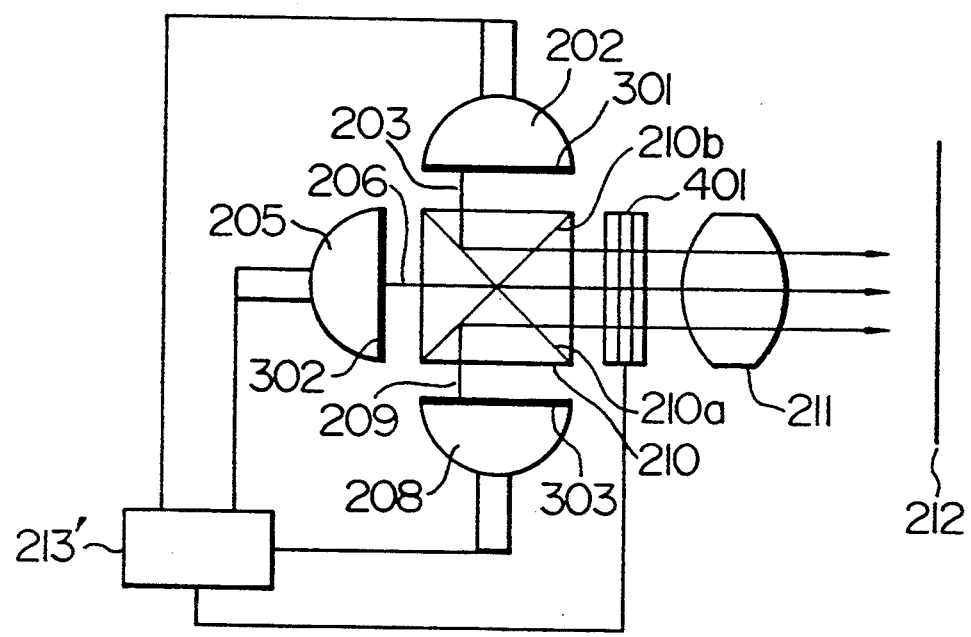
FIG. 20 is a block diagram showing a modified example of the projection-type display apparatus according to the present invention.

FIG. 20 shows the construction of the present modified example. The liquid crystal light valve used in the second embodiment described previously is disposed before none of the CRTs, but a single liquid crystal light valve is disposed between the dichroic prism 210 and the projection lens 211. The constituent parts identical to those in the second embodiment are denoted by same reference numerals and explanation thereof will be omitted.

Red light 203 and blue light 209 produced by the CRTs for red and blue 202 and 208 are reflected by reflecting films for red and blue 210a and 210b and green light 206 produced by the CRT for green 205 passes through the dichroic prism 210. Light from the prism 210 is income into the projection lens 211 after having been intensity-modulated by the liquid crystal light valve 401. Light of the three primary colors emitted by the three CRTs 202, 205 and 208 is intensity-modulated by the single liquid crystal light valve 401 so as to display a color image on the screen by means of the projection lens 211.

In the present modified example, the dichroic prism 210 is located between the different CRTs 202, 205 and 208 and the liquid crystal light valve 401. Therefore it is important that the light produced by the different CRTs is income into the projection lens with a high efficiency. Also in the present modified example an interference film is stuck or laminated on the tube surface of each of the CRTs so that light emitted by each of the CRTs comes into the projection lens with a high efficiency, as explained referring to FIG. 15.

Figure 21:
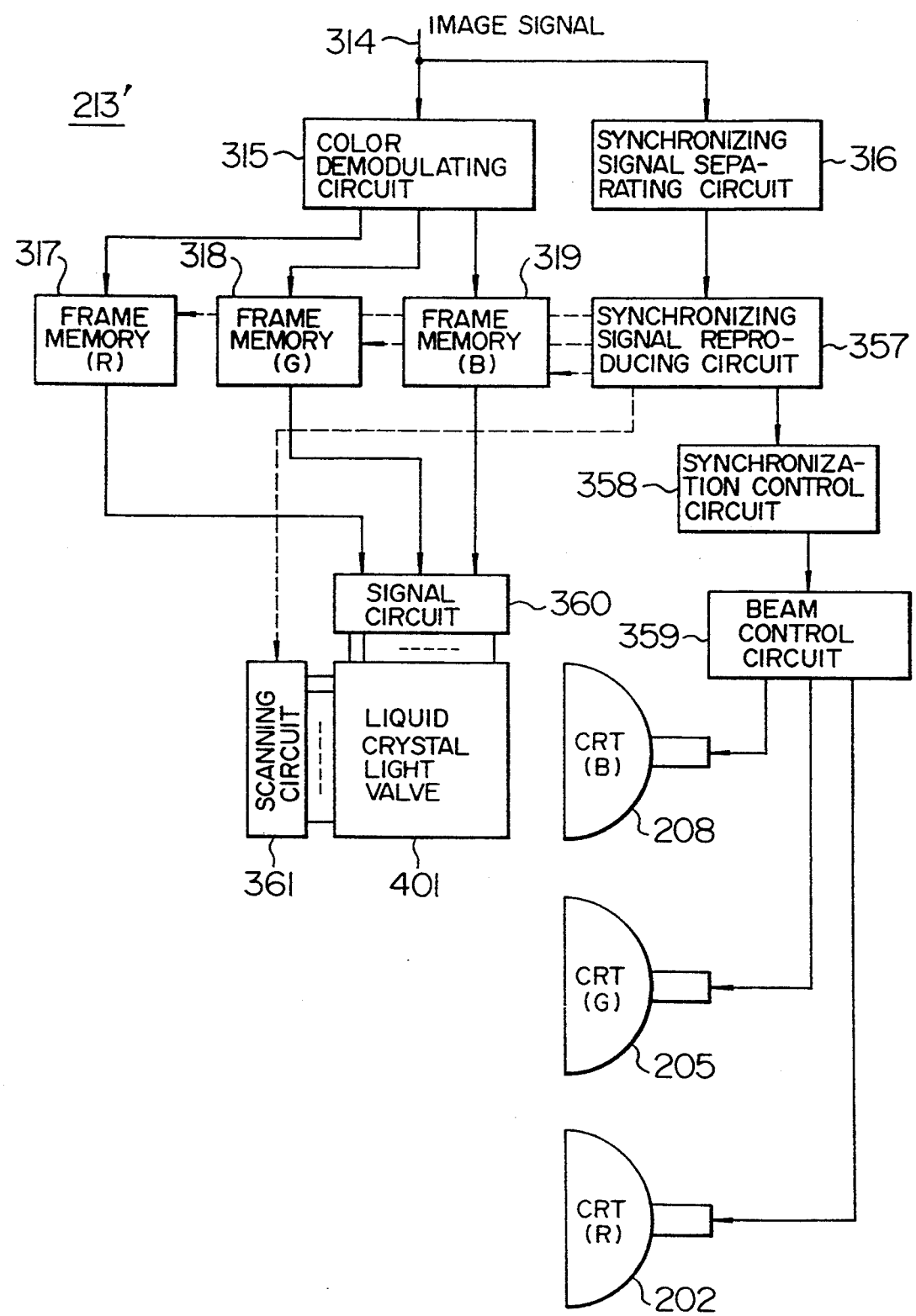
FIG. 21 is a block diagram showing the control system in the modified example.
Figures 22A, 22B, 22C, 22D:
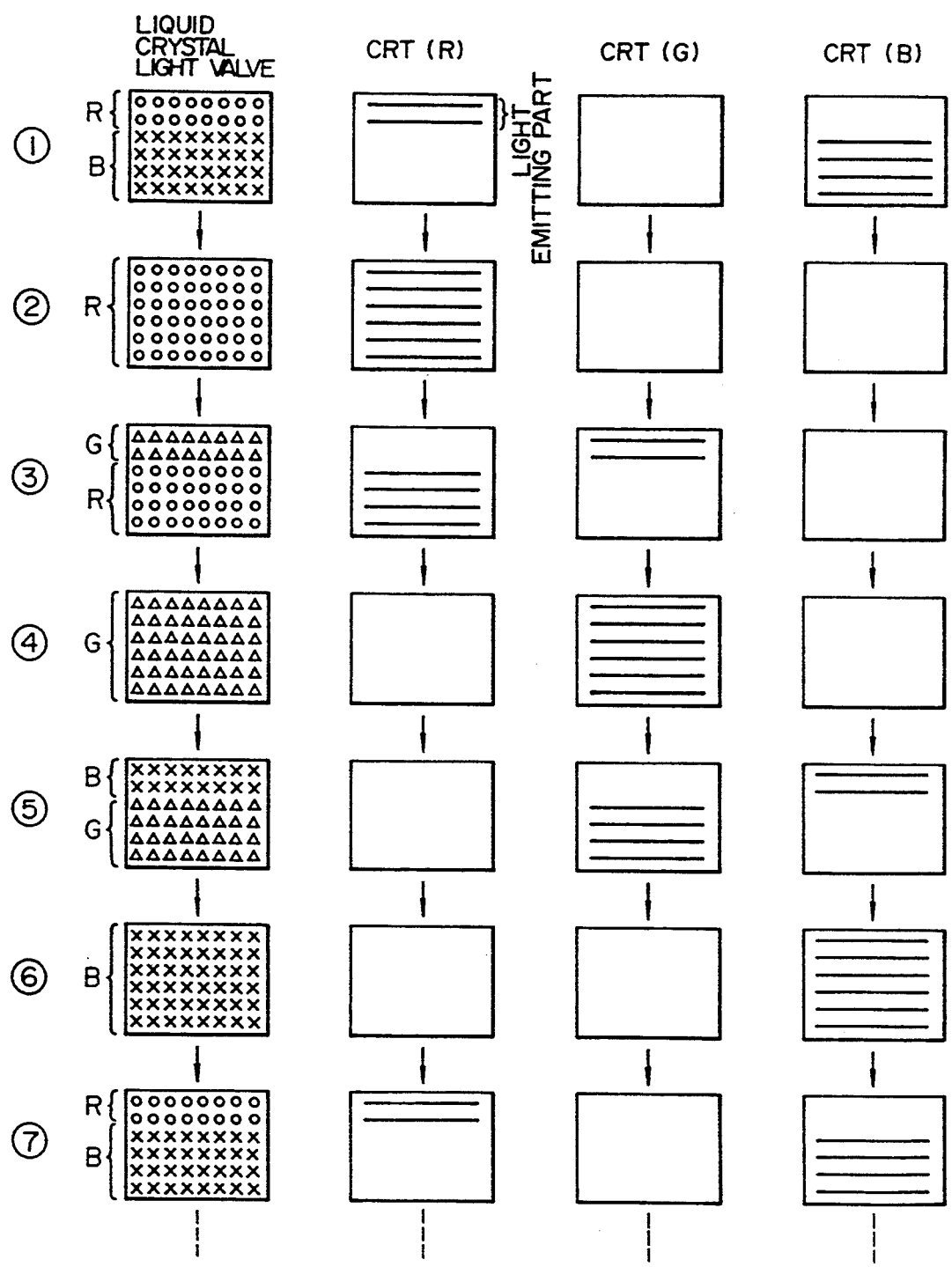
FIGS. 22A to 22D are diagrams for explaining the operation of the liquid crystal panels, CRT (R), CRT (G) and CRT (B), respectively, in the modified example.

Also in the present modified example, the three CRTs 202, 205 and 208 as well as the liquid crystal light valve 401 are controlled by a control system 213'. This control system 213' will be explained, referring to FIG. 21.

An image signal 314 received from broadcast electromagnetic wave, or inputted from a video deck, a video disk or another arbitrary signal source is supplied at first to a color demodulating circuit 315 to be converted there into different color signals of red, green and blue, which are the three primary colors. The color signals obtained by this conversion are stored in frame memories 317, 318 and 319 for every frame in the form of digital data, respectively. Further the image signal 314 is also inputted to a separating circuit 316, by which a reference sync signal component for the different signals is separated therefrom and a sync signal is reproduced by a reproducing circuit 357.

The frequency of the sync signal generated by the reproducing circuit 357 is so determined to be three times as high as that of the sync signal of the image signal 314.

From the first to the third frame, red, green and blue image signal data are inputted from frame memories .317, 318 and 319 respectively, controlled by the reproducing circuit 357, to the signal circuit 360 controlling the liquid crystal light valve 401. The liquid crystal light valve 401 is controlled by the signal circuit 360 and the scanning circuit 361 to reproduce red, green and blue images.

Further, at the same time the sync signal generated by the reproducing circuit 357 is converted into horizontal and vertical scanning signals by a synchronization control circuit 358 and in addition supplied to the CRTs 202, 205 and 208 so as to control these CRTs in synchronism with reproduction of a red, a green and a blue image on the liquid crystal light valve 401.

Next states, where the single liquid crystal light valve 401 reproducing the different color images corresponding to the three primary colors and the three CRTs 202, 205 and 208 emitting light of different colors corresponding similarly to the three primary colors are controlled in synchronism with each other as a result of the control by this control system 213', will be explained, referring to FIGS. 22A to 22D.

FIGS. 22A to 22D show the reproduced image on the liquid crystal light valve 401, the fluorescent state of the CRT for red 202, the fluorescent state of the CRT for green 205 and the fluorescent state of the CRT for blue 208, respectively, arranged time-sequentially, as shown downward by ①  to ⑥. After ⑥ the process returns to ①. Consequently, in the present modified example, the color reproduction by a so-called "frame sequential method", by which the images of different colors of red, green and blue are displayed time-sequentially during one frame period.

①  At first parts of a red image are reproduced successively on the liquid crystal light valve 401, starting from the highest line. Red light is emitted successively, starting from the highest line of the CRT for red 202, in synchronism with the state of the reproduction of the red image on the liquid crystal light valve 401 to display the red image. At this time the lines on the CRTs for green and blue 205 and 208, corresponding to the line emitting light on the CRT for red 202, emit no light.

②  On the liquid crystal light valve 401 the reproduction of the red image is continued towards the lower lines and finally the red image is reproduced on the whole surface.

③  Then on the upper lines of the liquid crystal light valve 401, the reproduction of the green image begins and green light is emitted successively by the lines on the CRT for green 205, starting from the highest line, in synchronism with the state of the reproduction of the green image on the liquid crystal light valve 401.

④  Thereafter the CRT for green emits light on the whole surface so that the green image is reproduced on the whole surface of the liquid crystal light valve 401.

⑤  Next on the upper lines of the liquid crystal light valve 401, the reproduction of the blue image begins and blue light is emitted successively by the lines on the CRT for blue 208, starting from the highest line, in synchronism with the state of the reproduction of the blue image on the liquid crystal light valve 401.

⑥  Thereafter the blue image is reproduced on the whole surface of the liquid crystal light valve 401 and thus the image of one frame is displayed by the frame sequential reproduction of RGB. In the succeeding state, the process returns to ①.

Consequently, according to the present modified example, the single liquid crystal light valve 401 reproducing or generating the images of different colors corresponding to the three primary colors by the frame sequential method and the three CRTs 202, 205 and 208 emitting the different colors corresponding to the three primary colors are controlled successively in synchronism with each other so that the color image is projected on the screen 212 and that an enlarged image is reproduced.

Next the relation between variations in the transmissivity at the each of the pixels of the liquid crystal panel and the light emitting state of the CRTs in the present modified example will be explained, referring to FIGS. 23A to 23E.

FIG. 23A shows one frame period of a usual image signal. One frame period of the scanning signal applied to the liquid crystal light valve 401 is 1/90 sec, which is equal to ⅓ of one frame period (1/30 sec) of a usual image signal (e.g., video signal).

For the first frame the image signal of a red image is applied to this liquid crystal light valve 401. Next a green image signal and then a blue image signal are applied thereto. The transmissivity of a certain pixel on the liquid crystal light valve 401 varies, depending on the image signal applied thereto. That is, as shown by FIG. 23B, for example, the transmissivity has a value corresponding to the red image by the red image signal for the first frame, a value corresponding to the green image by the green image signal for the second frame, and a value corresponding to the blue image by the blue image signal. Further, although it is not shown in the figure, for the succeeding frame the transmissivity has a value corresponding again to the red image of the succeeding image.

On the other hand, for the first frame, the CRT for red 202 is scanned with the electron beam in synchronism with the red image signal supplied to the liquid crystal light valve 401 to emit light as shown in FIG. 23C. Thereafter for the second frame, the CRT for green 205 is scanned with the electron beam in synchronism with the green image signal applied to the liquid crystal light valve 401 to emit light as shown in FIG. 23D. In the same way, for the third frame, the CRT for blue 208 is scanned with the electron beam in synchronism with the blue image signal applied to the liquid crystal light valve 401 to emit light as shown in FIG. 23E. Consequently, according to the present modified example, one liquid crystal light valve is sufficient and it is possible to realize a projection-type color display apparatus having a smaller size at a low cost.

Figure 24:
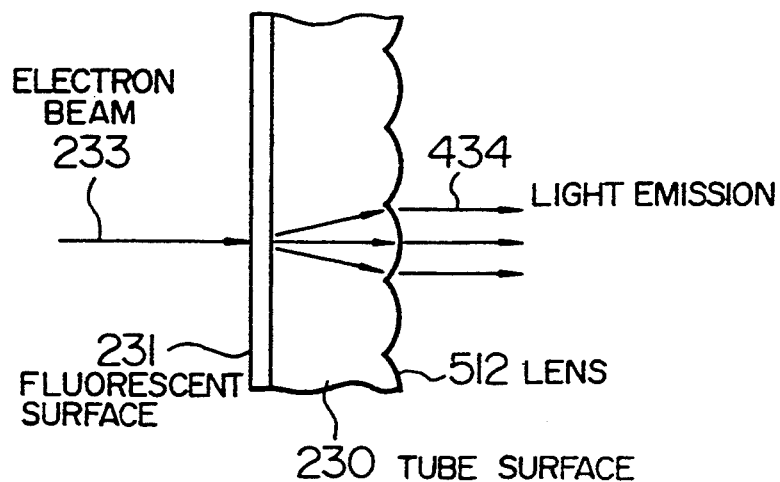
FIG. 24 is a diagram showing a modified example of the construction of the tube surface of the cathode ray tube in the second embodiment of the present invention.
Figure 25:
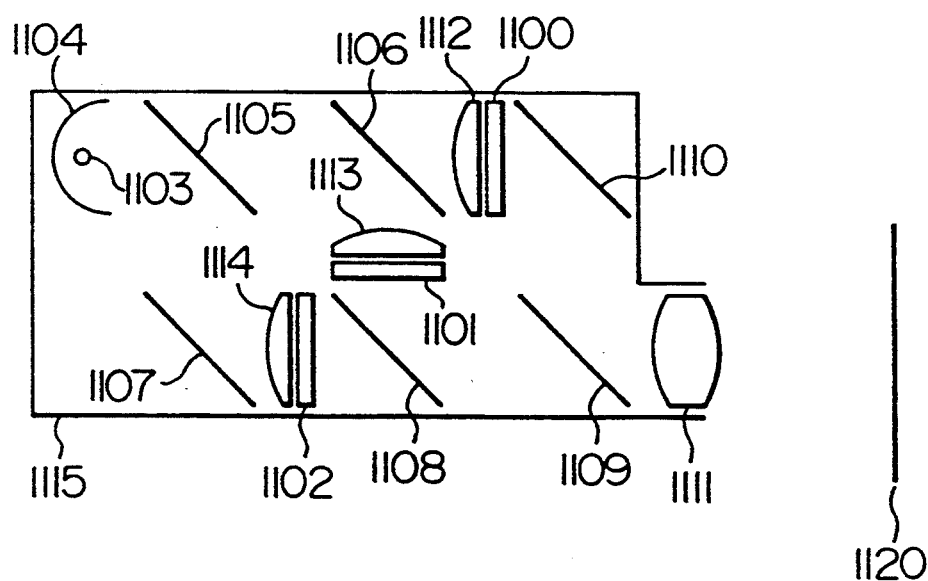
FIG. 25 is a diagram showing the construction of a prior art example of the projection-type display apparatus.

Although, in the above explanation, the interference films 301, 302 and 303 are disposed on the tube surfaces of the different CRTs, respectively, in order to income light emitted by the fluorescent planes of the CRT into the liquid crystal light valve with a high efficiency, another modified example for preventing this light loss will be explained, referring to FIG. 24. FIG. 24 shows a cross-sectional construction of the tube surface of each of the CRTs, in which a lens surface 512 is formed on the tube surface of the CRT, which is opposite to the fluorescent plane 231. Light 434 emitted by irradiating the electron beam 233 into the fluorescent plane 231 is not dispersed owing to this lens surface 512, as shown in the figure. Thus the light can reach the liquid crystal light valve with a high efficiency and it is utilized sufficiently. This lens surface 512 forms a so-called lenticular lens, in which a plurality of small lenses are arranged in an array shape, and the focal point of each of the lenses is located so as to be in accordance with the fluorescent plane 231 described previously. This lens surface 512 may be formed either by processing the tube surface 230 in a lens shape or by fabricating a separate lens array in a sheet shape, which is pasted or stuck on the tube surface 230. According to this modified example, the processing cost can be low and thus it is possible to obtain a lower cost projection-type display apparatus.

What is claimed is:

1. A projection type display apparatus comprising:
   optical signal generating means including liquid crystal panels of a reflective type corresponding to different spectra, each liquid crystal panel including a plurality of pixels, and being responsive to electric signals inputted thereto, for selectively reflecting incident light components having the different spectra and incident thereto in units of pixels to generate optical signals having the different spectra, respectively;
   wherein each of the said liquid crystal panels comprises:
      a monocrystalline semiconductor substrate with a transistor provided for each pixel on a surface thereof, the transistor changing its conductive state in response to the corresponding electric signal, and with a metal pixel electrode provided for each pixel above the transistor and connected to the transistor, for selectively reflecting the corresponding light component in accordance with the change in the conductive state of the transistor;
      a liquid crystal layer including liquid crystal material of a light scattering type, the liquid crystal material scattering a light upon nonapplication of a voltage and being transparent upon application of a voltage; and
      a transparent substrate with transparent counter electrodes provided thereon, the liquid crystal layer being sandwiched by the pixel electrodes and the counter electrodes, the counter electrodes functioning to selectively apply the voltage to the liquid crystal material together with the pixel electrodes in accordance with a change in the conductive state of the transistors;
   light supplying means for supplying a light;
   an optical separating/combining system for separating the liquid from said light supplying means into the light components in accordance with the spectra to irradiate the light components to the liquid crystal panels and for combining the optical signals to obtain an optical image signal; and
   projecting means for focusing the optical image signal to project an enlarged image on a screen.

2. A display apparatus according to claim 1 wherein said liquid crystal layer includes the liquid crystal material dispersed in a transparent organic material.

3. A display apparatus according to claim 2, wherein said liquid crystal layer includes encapsulated nematic liquid crystal dispersed in a polymer.

4. A display apparatus according to claim 1, wherein said liquid crystal layer includes smectic A phase liquid crystal.

5. A display apparatus according to claim 1, wherein said optical separating/combining system comprises a dichroic prism assembly for separating the parallel light from said light supplying means into three light components in accordance with the spectra such that one of the light components travels in a straight path, another of the light components is reflected in a direction perpendicular to a direction of the light and the remaining light component is reflected in a direction opposite to the direction of the another light component, to irradiate the light components to said liquid crystal panels, and for combining the optical signals generated by said liquid crystal panels into the optical image signal.

6. A display apparatus according to claim 5, further comprising a half mirror for reflecting a part of the light from said light supplying means and for supplying the reflected part to said optical signal generating means and for transmitting a part of the optical image signal to supply the transmitted part to said projecting means, and optical path of incident light from said half mirror to said optical signal generating means being the same as an optical path of the optical image signal from said optical separating/combining system to said half mirror.

7. A display apparatus according to claim 1, wherein said semiconductor substrate in each of said liquid crystal panels further comprises a circuit for driving said transistors in response to the corresponding electric signal.

8. A display apparatus according to claim 7, wherein said circuit of said semiconductor substrate in each of said liquid crystal panels includes:
   a driving circuit for generating row signals to selectively drive each of rows of matrix-like pixels of each of said liquid crystal panels;
   a supply circuit for selectively generating column signals to drive each of columns of the pixels in response to the corresponding electric signal inputted thereto; and
   a sample hold circuit disposed for each of the pixels for sampling in holding the corresponding column signal from said supply circuit in response to the corresponding row signal from said driving circuit.

9. A display apparatus according to claim 7, wherein said circuit includes:
   a matrix driving circuit for driving the pixels disposed in a matrix form in each of said liquid crystal panels;
   a frame memory for storing display information for one image; and
   a control circuit for controlling said matrix driving circuit in accordance with the display information stored in said frame memory.

10. A display apparatus according to claim 5, wherein said dichroic prism assembly is electrically connected with each of said liquid crystal panels through solder bumps and with an external circuit by a flexible flat cable.

11. A display apparatus according to claim 5, wherein an optical path of the light incident from said light supplying means is different from an optical path of the optical image signal.

12. A projection-type display apparatus comprising:
optical signal generating means including a plurality of liquid crystal panels respectively responsive to a plurality of electric signals inputted thereto, for generating a plurality of optical signals having different spectra corresponding to said plurality of electric signals;
wherein each of said liquid crystal panels comprises:
a semiconductor structure, which includes a semiconductor layer having a transistor for each of a plurality of pixels, for driving said each liquid crystal panel in units of pixels in response to corresponding one of said electric signals, and a pixel electrode layer having a pixel electrode for each pixel connected to the corresponding transistor, for selectively reflecting a light incident to said each liquid crystal panel in units of pixels as one of said optical signals;
a glass structure including a transparent glass substrate and a transparent electrode layer formed on a surface of said glass substrate facing said semiconductor structure, an axis perpendicular to a surface of said glass substrate opposite to said transparent electrode layer being not coincident with an optical axis of the incident light; and
a light-scattering-type liquid crystal layer interposed between said semiconductor structure and said glass structure;
control means responsive to an inputted electric image signal representing an image, for generating the plurality of electric signals to output the generated electric signals to said optical signal generating means and for controlling said optical signal generating means;
a combining optical system for visually combining the plurality of optical signals to obtain an optical image signal so as to provide said image; and
projecting means for focusing said optical image signal to project an enlarged image of said image on a screen.

13. A projection type display apparatus comprising:
optical signal generating means including a plurality of liquid crystal panels respectively responsive to a plurality of electric signals inputted thereto, for generating a plurality of optical signals having different spectra corresponding to said plurality of electric signals;
control means responsive to an inputted electric image signal representing an image, for generating the plurality of electric signals to output the generated electric signals to said optical signal generating means and for controlling said optical signal generating means;
means including a light source, for supplying light emitted from said light source as substantially parallel light;
a separating/combining optical system for separating the parallel light in accordance with the spectra to supply the separated parallel light to said liquid crystal panels, respective and for visually combining the plurality of optical signals to obtain an optical image signal so as to provide said image, wherein said optical signal generating means reflects the parallel light in accordance with the electric signals to generate the optical signals;
projecting means including a lens, for focusing said optical image signal by use of the lens to project an enlarged image of said image on a screen;
a photodetector for detecting a light amount; and
photodetector driving means for moving said photodetector to a focal point of said lens in replacing said light source such that a position of said light source can be adjusted based on a detecting result by said photodetector.

14. A display apparatus according to claim 13, further comprising:
light source driving means for moving said light source; and
adjusting means for previously storing an optimum light amount range for every kind of lamps used as said light source and for driving said light source driving means in accordance with the stored optimum light amount range and the detected light amount by said photodetector such is in said optimum light amount range for the kind of lamp used as said light source.

15. A projection type display apparatus comprising:
light emitting means including a light source, for emitting a light;
a half mirror for transmitting about one-half of the light incident from said light emitting means to said half mirror and reflecting a remaining half;
an optical separating/combining system for separating the transmitted light and the reflected light from said half mirror into transmitted light components having different spectra and reflected light components having different spectra, and synthesizing an even scanning line optical image signal from even scanning line light signals and an odd scanning line image signal from odd scanning line light signals and synthesizing an optical image signal from the even and odd scanning line image signals to supply the optical image signal to said half mirror;
optical signal generating means including two sets of liquid crystal panels for even and odd scanning lines, each of said liquid crystal panels being provided for one of the reflected and transmitted light components and being of a light scattering type, and responsive to electric signals inputted thereto, for generating the even and odd scanning light signals to output the generated even and odd scanning light signals to said separating/combining system, respectively;
control means responsive to an inputted electric image signal representing an image, for generating the electric signals to supply each electric signal to one of said liquid crystal panels; and
projecting means for focusing the optical image signal transmitted by said half mirror to project an optical image of said image on a screen.

16. A method for projecting an enlarged image on a screen comprising the steps of:
separating an electric image signal representing the image into a plurality of electric signals corresponding to different spectra;
separating an incident light into three light components corresponding to primary colors by a dichroic prism assembly, a path of the light component transmitted by said prism assembly being perpendicular to each of the remaining light components;

selectively reflecting the corresponding light component in units of pixels in response to the corresponding electric signal by a corresponding liquid crystal panel which includes liquid crystal material of a light scattering type and a pixel electrode for each pixel such that the corresponding light component is scattered in each pixel upon non-application of a voltage to the pixel and such that the corresponding light component is reflected by the pixel electrode of each pixel upon application of a voltage to the pixel and generating optical signals corresponding to the electric signals;

synthesizing an optical image signal from the optical signals by the dichroic prism assembly; and enlarging and projecting the optical image signal on a screen.

17. A method according to claim 16, wherein said step of projecting the optical image signal comprises the steps of:

collecting the optical image signal by a first lens; and projecting the image corresponding to the optical image signals collected by said first lens on the screen by a second lens, an optical axis of the incident light being different from that of the optical image signal.

18. A projection type display apparatus comprising:

optical signal generating means including liquid crystal panels of a reflective type corresponding to different spectra, each liquid crystal display panel including a plurality of pixels, and being responsive to electric signals inputted thereto, for selectively reflecting incident light components having the different spectra and incident thereto in units of pixels to generate optical signals having the different spectra, respectively;

wherein each of said liquid crystal panels comprises:

a semiconductor substrate with a transistor provided for each pixel on a surface thereof, the transistor changing its conductive state in response to the corresponding electric signal, and with a pixel electrode provided for each pixel above the transistor and connected to the transistor, for selectively reflecting the corresponding light component in accordance with the change in the conductive state of the transistor;

a liquid crystal layer including liquid crystal material changing its scattering state and transparent state in accordance with a voltage applied thereto;

a transparent substrate with transparent counter electrodes provided thereon, the liquid crystal layer being sandwiched by the pixel electrodes and the counter electrodes, the counter electrodes functioning to selectively apply the voltage to the liquid crystal material together with the pixel electrodes in accordance with a change in the conductive state of the transistors;

light supplying means for supplying a light;

an optical separating/combining system for separating the light from said light supplying means into the light components in accordance with the spectra to irradiate the light components to the liquid crystal panels and for combining the light components reflected from said liquid crystal panels to obtain an optical image signal; and projecting means for focusing the optical image signal to project an enlarged image on a screen.

19. A display apparatus according to claim 18, further comprising control means responsive to an inputted electric image signal representing an image, for generating the plurality of electric signals to output the generated electric signals to said optical signal generating means and for controlling said optical signal generating means.

20. A display apparatus according to claim 18, wherein said light supplying means comprises a light source for supplying light emitted from said light source as substantially parallel light.

21. A display apparatus according to claim 20, further comprising positioning means for positioning said light source in order to correct deviation of an optical axis between said light source and said projecting means.

22. A display apparatus according to claim 21, wherein said positioning means comprises a photodetector for detecting a light amount, and photodetector driving means for moving said photodetector to a focal point of a lens of said projecting means such that a position of said light source is adjustable in accordance with a detecting result of said photodetector.

* * * * *